US012362772B2

(12) United States Patent
Epstein

(10) Patent No.: US 12,362,772 B2
(45) Date of Patent: Jul. 15, 2025

(54) FLEXIBLE WIRELESS INTERCONNECTION AND BOARD DIVERSITY

(71) Applicant: OMNIFI INC., Pleasanton, CA (US)

(72) Inventor: Joseph Alan Epstein, Pleasanton, CA (US)

(73) Assignee: Omnifi Inc., Pleasanton, CA (US)

( * ) Notice: Subject to any disclaimer, the term of this patent is extended or adjusted under 35 U.S.C. 154(b) by 663 days.

(21) Appl. No.: 17/379,197

(22) Filed: Jul. 19, 2021

(65) Prior Publication Data

US 2022/0029649 A1     Jan. 27, 2022

Related U.S. Application Data

(60) Provisional application No. 63/054,332, filed on Jul. 21, 2020.

(51) Int. Cl.
| | |
|---|---|
| *H04B 1/03* | (2006.01) |
| *H01Q 1/24* | (2006.01) |
| *H01Q 23/00* | (2006.01) |
| *H04B 1/04* | (2006.01) |
| *H04B 1/16* | (2006.01) |

(52) U.S. Cl.
CPC .............. *H04B 1/03* (2013.01); *H01Q 1/246* (2013.01); *H01Q 23/00* (2013.01); *H04B 1/04* (2013.01); *H04B 1/1607* (2013.01)

(58) Field of Classification Search
None
See application file for complete search history.

(56) References Cited

U.S. PATENT DOCUMENTS

| | | |
|---|---|---|
| 7,231,224 B1 | 6/2007 | Chesson |
| 8,705,967 B2 | 4/2014 | Beach |
| 12,035,186 B2 * | 7/2024 | Salas Moreno ...... H04B 10/116 |

(Continued)

FOREIGN PATENT DOCUMENTS

KR     101635182 B1     6/2016

OTHER PUBLICATIONS

International Search Report and Written Opinion for Application No. PCT/US2021/42158, mailed on Oct. 22, 2021, 48 pages.

(Continued)

*Primary Examiner* — Pablo N Tran
(74) *Attorney, Agent, or Firm* — Baker Botts L.L.P.

(57) ABSTRACT

Systems and methods for providing access to a wireless network include apparatus and manufacturing and configuration techniques. Embodiments include a head-end configured to receive electrical power and communicate with the wireless network. In an embodiment, a plurality of integrated access points each comprise components such as a radio, a power supply, a controller, a network transceiver, and an antenna. The components of each integrated access point, whether or not they are assembled on one or more rigid or flexible cards, may be embedded in a material expanse such as a flexible strip, upon which each set of components may be proximally integrated. In an embodiment, a system includes a unified backplane interconnect coupled to the head-end, the unified backplane interconnect comprising a plurality of interconnects. Each integrated access point may comprise a single radio, or more than one radio.

12 Claims, 30 Drawing Sheets

(56) References Cited

U.S. PATENT DOCUMENTS

| | | | | |
|---|---|---|---|---|
| 2012/0164877 A1* | 6/2012 | Wallace | ............ | H04L 12/2898 |
| | | | | 439/535 |
| 2012/0170558 A1 | 7/2012 | Forbes | | |
| 2013/0028605 A1 | 1/2013 | Beach | | |
| 2014/0266973 A1 | 9/2014 | Devries | | |
| 2015/0110212 A1* | 4/2015 | Pabla | ................ | H04W 72/541 |
| | | | | 375/267 |
| 2016/0029464 A1* | 1/2016 | Hughes | ................ | H05B 45/22 |
| | | | | 315/131 |
| 2017/0115927 A1 | 4/2017 | Martin | | |
| 2018/0166770 A1* | 6/2018 | Frigon | ................ | H01Q 1/2291 |
| 2019/0341674 A1 | 11/2019 | Rosenthal | | |
| 2020/0106499 A1* | 4/2020 | Branlund | ............ | H04B 7/0617 |

OTHER PUBLICATIONS

Anonymous, Examination Statement for Taiwanese Patent Application No. 110126376, dated Dec. 27, 2024, 40 pages, pub. by Taiwan Advanced Patent and Trademark Office, Taipei, Taiwan.
Ciccarese, Corrado, Extended European Search Report for European patent application No. EP21846695.1, dated Oct. 1, 2024, 13 pages, published by the European Patent Office, Munich, Germany.
Lu Liru, Office Action for Singapore Patent Application No. 11202300459P, dated Oct. 24, 2024, 9 pages, pub. by Singapore Intellectual Property Office, Paya Lebar Quarter, Singapore.

* cited by examiner

FLEXIBLE WIRELESS INTERCONNECTION AND BOARD DIVERSITY

BENEFIT CLAIM

This application claims the benefit under 35 U.S.C. § 119 of provisional application 63/054,332, filed Jul. 21, 2020, the entire contents of which is hereby incorporated by reference as if fully set forth herein.

COPYRIGHT NOTICE

A portion of the disclosure of this patent document contains material which is subject to copyright protection. The copyright owner has no objection to the facsimile reproduction by anyone of the patent document or the patent disclosure, as it appears in the patent file or records, but otherwise reserves all copyright or rights whatsoever. © 2020-2021 Plumeria Networks, Inc.

TECHNICAL FIELD

One technical field of the present disclosure is Wireless Local Area Networking (WLAN), particularly the structure of access points. Another technical field is telecommunications. Another technical field is electronic device manufacturing and configuration. Another technical field is circuit board assembly.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

One major problem with traditional wireless networking installations is that the radios are in discrete, self-contained, and expensive devices, sometimes called access points. This creates a necessary tension between placing enough for adequate service, and not overbuying. Moreover, each discrete box is a highly imperfect wireless device, given that it must hope to rely on the antennas in its small enclosure having a sufficiently adequate pattern to go through whatever obstacles lie between it and the device it is speaking to, which can be far away. Therefore, these wireless devices may require careful planning upon installation to ensure a clear enough field of view in every important direction. And, traditionally, each access point incorporating each radio may need to be cabled to a distant switch, even when two or more access points are relatively near one another. A traditional setup can require large expenditures for cabling, installation, and the switch itself. If the foregoing inefficiencies and issues could be overcome, the resulting solution would represent a distinct advance in the state of the art.

SUMMARY

The appended claims may serve as a summary of the invention.

DETAILED DESCRIPTION

Figure 1A:
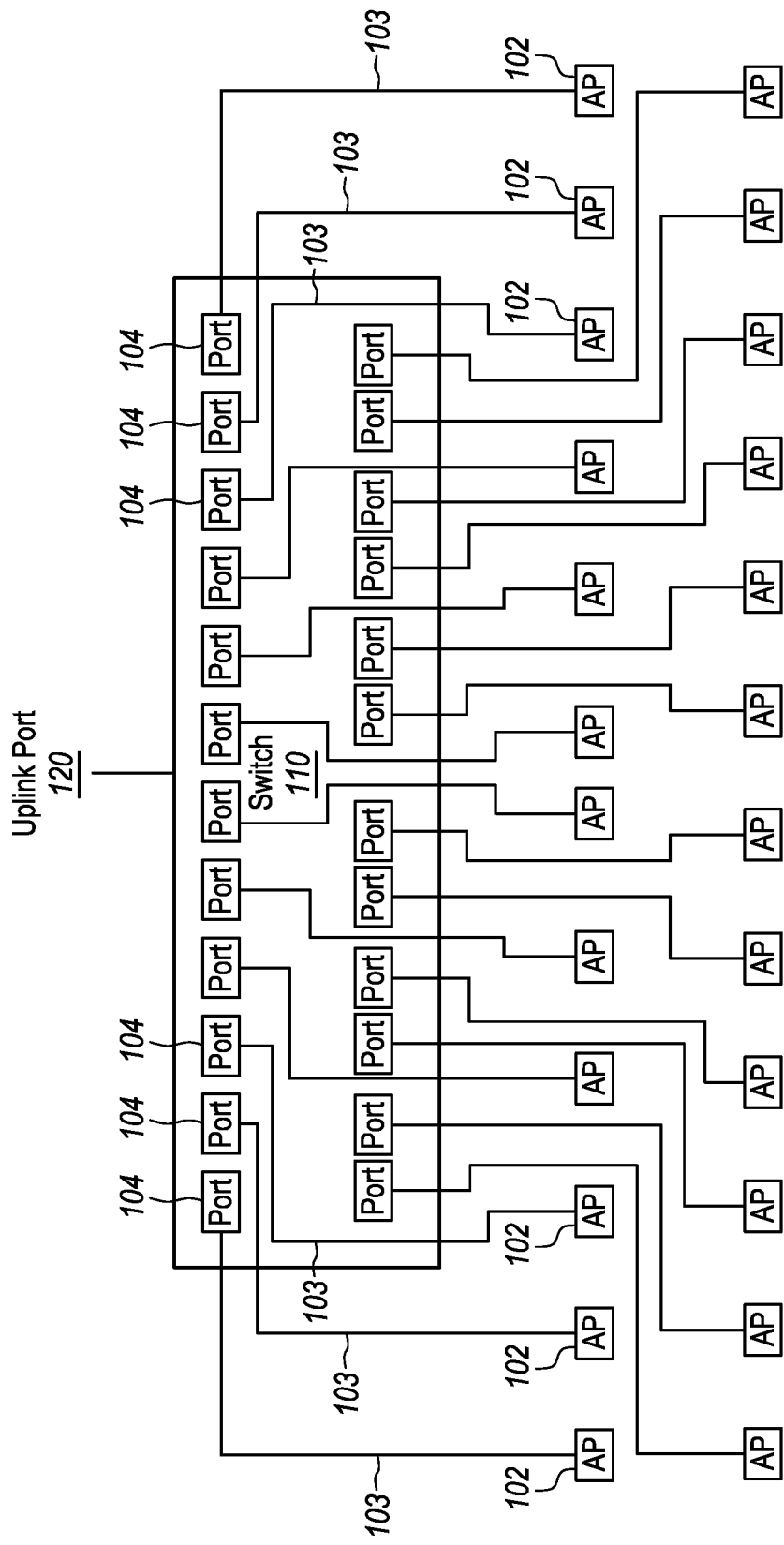
FIG. 1A illustrates a traditional interconnection used for wireless deployments.

In the following description, for the purposes of explanation, numerous specific details are set forth in order to provide a thorough understanding of the present invention.

It will be apparent, however, that the present invention may be practiced without these specific details. In other instances, well-known structures and devices are shown in block diagram form in order to avoid unnecessarily obscuring the present invention.

PCT Publication No. WO1120185953A1 shows, among other things, a method for providing wireless Internet access, wherein some embodiments use strips (or wires or sheets or other distance or area filling materials, a "material expanse") which may be populated throughout with multiple switchable antennas connected to multiple radios on the strip and connected by a backplane. In some embodiments, various antennas have different patterns and locations at multiple distances along the strip, thus allowing disclosed systems to choose one or more antennas with those different patterns at different locations along the strip to assemble, based on switching decisions, a total pattern of potentially nearly arbitrary shape. The present disclosure teaches, among other things, specific manufacturing and configuration techniques for providing access to a wireless network. While the present disclosure is directed to different novel innovations, PCT Publication No. WO1120185953A1 explains, among other things, how a flexible PCB printed antenna set may be implemented, and one way of implementing one or more antennas that are selectable and movable for providing access to a wireless network.

The present technology includes systems and methods for providing access to a wireless network. An embodiment of a system according to the present technology includes a head-end configured to receive electrical power and communicate with the wireless network. The head-end may aggregate traffic from integrated access points into an uplink port. The head-end may comprise an External Network to Backplane Converter. The strip has its own internal network—the backplane—which may comprise custom networking technology. In embodiments employing Ethernet, for example, to transfer the traffic onto a normal Ethernet network, the head-end may bridge the traffic (or do other internetworking) between the Ethernet network and a custom backplane network.

In an embodiment, a plurality of integrated access points each comprise components such as a radio, a power supply, a controller, a network transceiver, and an antenna. The controller may be a CPU, a SoC, or another controller type. The antenna may be flexible PCB printed. Some components of each integrated access point may be assembled on a respective rigid card which may be referred to as an assembly board. The components of each integrated access point, whether or not they are assembled on one or more rigid or flexible cards, may be embedded in a material expanse such as a flexible strip, upon which each set of components may be proximally integrated. Some components of each integrated access point may be assembled in a built-up strip enclosure comprising potting. In embodiments, the bulk of the strip may be potted, but in other embodiments most of the strip comprises a hollow conduit. In an embodiment, a system includes a unified backplane interconnect coupled to the head-end, the unified backplane interconnect comprising a plurality of interconnects. In an embodiment, the interconnects may be communicatively coupled in series, a first interconnect connecting the head-end to a first integrated access point, and each subsequent interconnect connecting adjacent integrated access points. In other embodiments, interconnects may be interleaved in the material expanse or strip, such that adjacent integrated access points are not directly connected to one another. Interconnects may be USB, Ethernet, or another type of interconnect. Each integrated access point may comprise a single radio, or more than one radio. A particular radio may be Wi-Fi or another type of radio such as Bluetooth, Zigbee, Z-Wave, Thread, or a vector baseband or digital baseband, and may transmit at various frequencies including 2.4 GHz, 3.5 GHz, 5 GHz, 6 GHz, 60 GHz, or another frequency. The forgoing embodiments are examples only: the present technology includes other systems and methods explained in more detail throughout this disclosure.

Embodiments are described in sections below according to the following outline:
1. MOTIVATIONS
   1.1 DISADVANTAGES OF TRADITIONAL INTERCONNECTS FOR WIRELESS DEPLOYMENTS
   1.2 ADVANTAGES OF EXAMPLE EMBODIMENTS
2. GENERAL OVERVIEW
3. STRUCTURAL AND FUNCTIONAL OVERVIEW
   3.1. INTEGRATED ACCESS POINT ASSEMBLY
   3.2 INTERCONNECTS
   3.3 RADIOS 1. Motivations 1.1 Disadvantages of Traditional Interconnects for Wireless Deployments One motivation of the present disclosure is eliminating installation complexity and redundant resource use. FIG. 1A shows a traditional interconnection used for wireless deployments. Each access point 102 (labeled "AP") is an individual discrete device, a separately encased apparatus with at least one radio, a CPU, and a network connection. An installer mounts the access point 102 on the wall or ceiling, usually by finding the right mounting bracket provided by the access point manufacturer. Some mounting brackets clip to the T rails of suspended ceilings. Some need to be screwed into surfaces. Some access points 102 have integrated mounting options, usually screw hanger holes, to allow the screw-in installation method to be used without a bracket.

Each access point 102 is connected by manually running a distinct cable 103—usually Ethernet cabling—through raceways, above ceiling tiles, or in cable trays or off of cable hangers, to a multi-port switch 110, comprising a plurality of ports 104. The cable 103 provides the necessary data throughput and often power, using Power over Ethernet technology. The multi-port switch 110 is an expensive item, designed to handle both wired and wireless deployments in most cases, and as such often does not have sufficient power budget to power every port 104 the way every access point 102 requires—and furthermore often contains features useful for advanced wired networks that wouldn't be needed for wireless networks. Because of that, customers often have to overpay by buying more ports than needed—sometimes twice as many—knowing that half will go unused, just to ensure sufficient power budget. It is not unusual to see a 48-port switch with less than 30 ports occupied for this reason. And it is important to note that as wireless technologies improve generation-to-generation, their power demands often significantly increase as the first wave of technology comes out, and then decreases as the second wave in a given generation comes out and the integrated circuit designers have optimized the power draw. Of course, such reductions do not benefit the customer who has already purchased a switch 110.

The switches 110 themselves aggregate the traffic from the access points 102 into an uplink port 120—also usually Ethernet—and destined to larger switches or routers.

Because a purpose of wireless is to provide ubiquitous coverage per square foot no matter how the traffic moves, the wireless capacity is often greatly overprovisioned. At the switch 110, the overprovisioning is typically not recreated. Very commonly, a corporation may have a single gigabit per second incoming Ethernet port from the service provider, thus feeding into a switch 110 with, say, 24 downstream 1 gigabit ports 104 destined for 24 1 gigabit access points 102. Thus, the wireless is overprovisioned 24:1. Of course, since almost all services lie in the cloud now and not on premises, almost all traffic is destined for the Internet and the most the entire system can carry is 1 gigabit per second, which means that the major requirement becomes only that each access point 102 can achieve its peak 1 gigabit per second in case everyone is clustered there, and the remaining 23 gigabits per second which could have been possible for side-to-side traffic is ignored as being unutilized. Over the years, the vendors of the access points and switches have combined, allowing the switch vendor to match the power budget to the number of ports for a given access point model. However, this has rarely ever saved a customer money or resources. Early adopting customers still must buy the higher-power device, and because the installation is expected to be wireless, the increase in power budget really translates into a sharp increase in the per-port switching cost, by eliminating the unused ports but still charging for the higher-end base model. A 48-port switch with 24 PoE ports is significantly more expensive than a 24-port switch but is not much more expensive—if at all—than a 24-port switch with 24 PoE ports.

This overdependence on splitting an unpredictable wireless network's load over dozens or hundreds of independent, home-ran access points and thus switch ports leads to a real industry problem with the pace of throughput improvements and standardization. In the Ethernet world, high throughput interfaces are defined for data center environments first—and compliant products are built for data center customers first, and thus are sold at extremely high prices that match with the small but critical demand that data centers provide. (Data centers is a well-known premium market). However, because wireless has unpredictable real-world peak demand throughput requirements, switch ports and access point peering ports must be able to support a high throughput. Large companies have tens to hundreds of thousands of access points 102. It would be impossible for their switches 110 and access points 102 to have data center components—the cost would be unbearable, and that's assuming that there is both sufficient supply and that the components can operate with the lower thermal and power draw requirements of embedded systems, rather than force-air cooled data centers. When 1000BASE-T was defined, the next step for data centers was 10GBASE, at first optical, then short twinax, and finally twisted pair. However, access points could operate at over a gigabit of throughput. Even to this day, 10GBASE-T is too expensive and power hungry for most access points 102. So the standard was not able to keep up, and a few industry leaders came up with their own proprietary stopgap 2.5 and 5GBASE-T "standards", which did solve a problem to some extent, but in doing so required customers to replace their 1000BASE-T switches with an intervening eventual standard that would quickly become obsolete. And today, any customer with NGBASE-T switches is finding that Wi-Fi 6 and 802.11ax may require them to replace those very new switches yet again. This whole cycle is caused by having to aggregate wireless throughput in a hub-and-spoke model and is broken. By analogy, discount airlines have been able to show that, by avoiding hubs, one can distribute the load more predictably and efficiently—and at a far lower cost to everyone. When Chicago is snowed in, many flights of one carrier are affected but discount carrier customers barely notice it outside of the few people actually going to Chicago as a final destination.

Beyond the wasted switching is the cabling expense, which itself can rival the cost of the underlying access points. Cabling is a manual effort, as mentioned above, and often involves licensed electricians or data cablers—often unionized—to install. And cables 103 are ugly—often blue and certainly not aesthetic when matched with common architectural demands—and thus can require even more effort to hide or obscure. Cables 103 are rarely paintable, nor should they be painted, for it obscures the markings on the cable identifying which category (Category 5, Category 6A, etc. . . . ), fire and UL rating, and manufacturer the cable is. Besides, cables are often bundled, but loosely, so the bundling prevents paint from hitting most of the surface but the looseness allows the cables to slide around a bit over time and expose the unpainted surfaces blocked by the very bundling—especially when someone has to add or alter the cabling or track down problems. Bundled cables have their own fire rules to prevent overheated bundling. Moreover, exposed cables 103 run the risk of getting nicked or pulled.

The installation of each cable 103 thus often requires a ladder, to place the cables 103 high enough to be out of common reach and especially out of common view—usually at the ceiling. It requires someone who understand the National Electric Code and local fire and electrical codes to prevent running low-power data cables with high-power electrical cables, or to prevent bundles from being made too thick for their fire rating, or to properly route them through holes between walls. In some jurisdictions, cabling is routed in conduit, in part or in whole, thus adding greatly to the expense.

And, to go along with the problem of increasing Ethernet speeds and power requirements requiring updated switches 110, the cables 103 have to be replaced too. Higher-speed Ethernet usually requires a higher category of cable, one rated to greater MHz bandwidth. These cables are often thicker and have larger bend radius requirements. Furthermore, increased power draw through the cables triggers different and changing maximums for cable bundles from electrical and fire codes. Therefore, a cable upgrade may require new cable trays or redrilled holes (often through concrete walls) to fit the thicker cables or more and different trays and new holes, if the bundles need to now be split.

The ultimate issue is that installing one thousand access points 102 involves installing a thousand cables 103—each hand pulled—and a thousand managed and PoE powered switch ports, and in a hub-and-spoke pattern with home-ran cables back to the switch leading to large bundles or numerous cable paths away from coverage.

Anything that can be done to reduce the number of cables 103 is a good thing. In some recent traditional access points, a second Ethernet port is made available on each access point, with pass-through PoE provided. The hope is to be able to cut the number of home runs of cable in half, thus allowing a second access point to wire to the first. Of course, the number of cables is not reduced, just their routing. Furthermore, the PoE budget for each switch port is then doubled—thus causing a switch that was properly loaded with one-to-one APs to now be 2× overpower budget with doubled APs. Since the power budget is often determinative of the cost, the switching budget is not significantly reduced. Furthermore, the access points now must have extra circuitry, at significant expense, to terminate the incoming PoE and pass through enough power for the next AP, as well as double the number of Ethernet PHYs. Ethernet PHYs are expensive—especially higher bandwidth ones. And power circuitry itself is not trivially cheap. Therefore, doubling up access points can add hundreds of dollars to the price of each access point while making only a minor reduction in the cabling cost—mostly saving on raw cable and not the labor, as labor often is charged by the number of cables or the length of distinct routes, this latter being identical for a doubled-up system and a fully home-ran system.

In any event, doubling up might only change the linearity factor of the cabling cost. Cabling, and switching, may remain linear in the number of access points and only mildly different.

One of the primary motivations of the present disclosure is to break the cost curve of installation by greatly reducing these multiples, if not making them closer to being closer to or approximately fixed or sublinear rather than linear.

1.2 Advantages of Example Embodiments

Figure 1B:
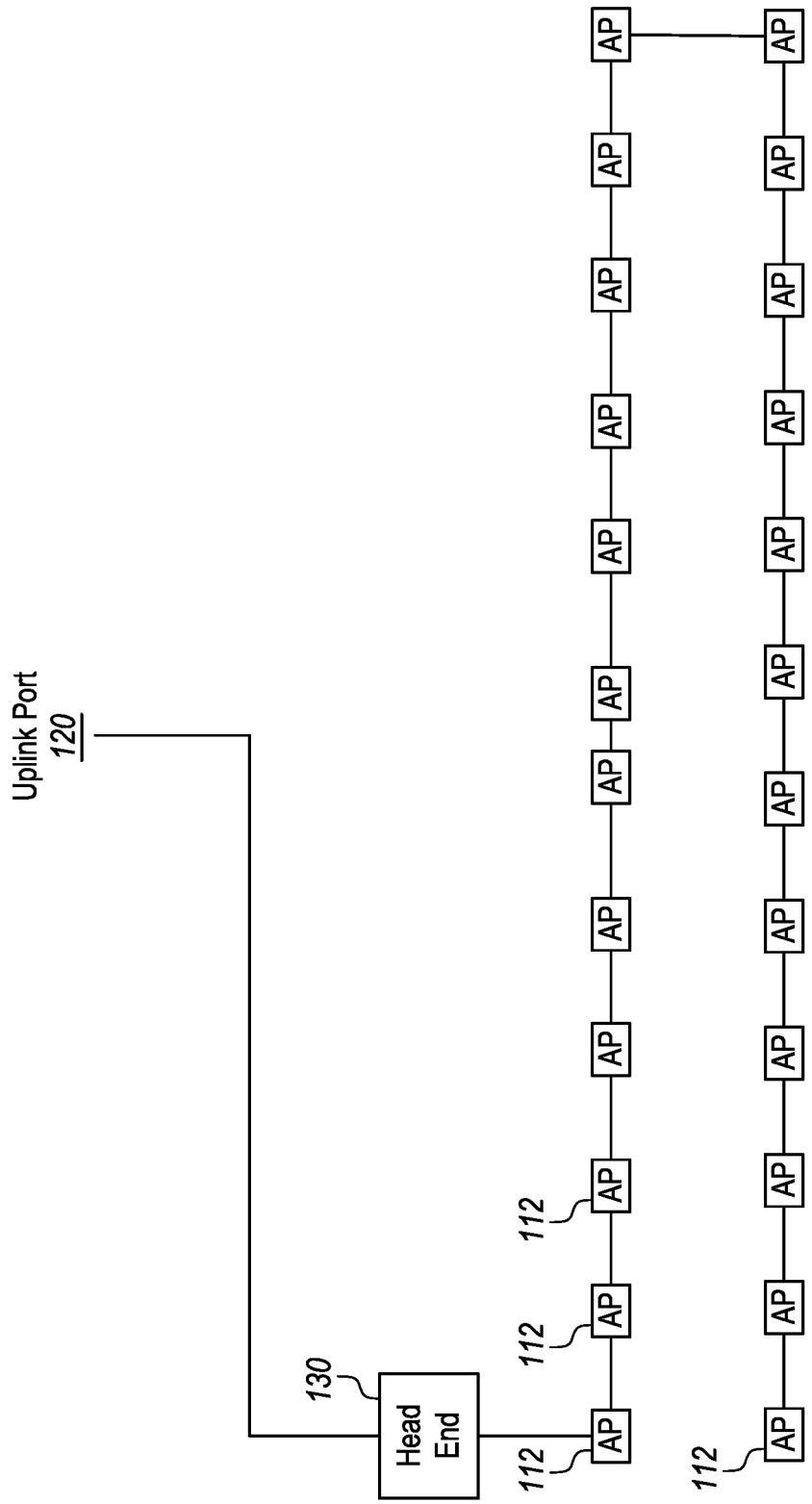
FIG. 1B illustrates the context of use and principal functional elements with which one embodiment of the present technology may be implemented.

FIG. 1B illustrates the context of use and principal functional elements with which one embodiment of the present technology may be implemented. FIG. 1B shows an embodiment of a network that may reduce problems associated with excess cabling and switching. Each integrated access point 112 may be daisy chained, which may produce a dramatic reduction in the amount of cabling—potentially over 10 times less cabling. The switch itself may be dispensed with and replaced with a two-port head-end 130 unit, responsible for powering the integrated access points 112. The head-end may aggregate the traffic from the integrated access points 112 into an uplink port 120, such as an Ethernet port.

Embodiments of the present technology broadly implemented as illustrated in FIG. 1B may benefit not only from reduced cabling, but also from reduced power and network bandwidth, to an amount needed without excess wasted provisioning that switches require. For example, a switch 110 (FIG. 1A) must power every access point 102 up sufficiently to allow it to provide proper services. Access points 102 may have different power modes, such as a mode to stop transmitting at night, but much of the power is lost in resistance from the switch to the access points 102 in a traditional model. The great reduction in cabling shown in FIG. 1B may provide a dramatic reduction in resistive loss. Moreover, embodiments that depart from traditional Power over Ethernet (PoE) configurations may allow a head-end and/or neighboring integrated access points 112 to manage their own power draw.

Furthermore, in the topology of FIG. 1B, the node-to-node networking bandwidth may not need to be greater than the bandwidth coming in from the uplink port 120. If the uplink is 1 Gbps, then that knowledge can be used to reduce the bandwidth between integrated access points 112 to be 1 Gbps as well. This may eliminate the need to have a switch that is capable of handling any more than 1 Gbps—and essentially all multi-port switches today are designed to handle some multiple of the number of ports in bandwidth. Even if a 48-port gigabit switch has a reduced capacity, it will usually be a percentage of the ports, such as 50% being 24 Gbps of non-blocking throughput. In that case, a 1 Gbps uplink wastes 23 Gbps of that already 50% reduced switch.

Another advantage of a chained configuration as illustrated in FIG. 1B is that different models may be produced for different uplink port speeds. If 40 Gbps is required, then a 40 Gbps chain can be produced—potentially at significantly less cost than a 40 Gbps non-blocking multiport switch with traditional access points. Therefore, with the disclosed topology, overall installation and material costs may be greatly reduced.

Notably, daisy chaining traditional technologies may be prohibitively expensive or might not lead to a functioning configuration at all. Doubled-up APs may require increasing, not decreasing, the costs of access point, because each component may need to be interchangeable and standardized, and standards can be expensive. To daisy chain 48 traditional access points, all of the power budget might need to be injected into just one port. But the PoE standards might not allow for that much power. The cables themselves, being twisted pairs of thin copper, may not be able to carry that much power, and might melt, assuming that the resistive loss was itself not enough to fail to power a device. There are no known PoE integrated circuits that could handle that much power.

Maintaining PoE power budgets within an access point may require tedious effort on the part of the board designer, who may have to insert large-footprint and not trivially priced power distribution circuitry within the board to ensure a power tree that gives the necessary power to each component without exceeding the power input from PoE. PoE switches monitor the power draw of each port, and should a device on that port exceed the amperage specified by the standard and/or allotted to it by the administrator in the power budgeting, then the switch may throw an alarm and power down the port entirely. To avoid such power downs, access point designers and software engineers must carefully ensure that the hardware operate within a precise upper bound for power draw. Running an algorithm that draws too much CPU power while the access point is operating towards peak throughput can easily exceed such bounds.

Embodiments of the disclosed technology may solve the aforementioned problems. Various embodiments address each of these problems both in turn and together. By replacing access points with a strip, fabric, or integrated "Christmas lights" string, the entire network can go from being electrical cabling connecting appliances to one large appliance. Appliances do not have the same requirements for installation and can often be done more economically. By using a closed system in embodiments, custom power distribution can be employed which may provide 300 Watts or more into the strings or strips—far exceeding the standards' needs for data cabling in general, but perfect for wireless. And with custom power comes custom power management, to allow neighboring underutilized radios to power down or off nearly completely—saving for a wake signal—thus reducing that wattage significantly in most cases. Avoiding standardized PoE and using embedded power may allow for more tolerance to power spikes while providing an overall smoother total system power draw. And custom networking may allow for far cheaper interconnects to be employed, such as single or braided USB—not ever used for long distance networking, but as can be seen on inspection, in the present technology the maximum interconnect distance can be dropped tremendously for the same square footage of coverage, thus potentially allowing far shorter-running interconnects to be used liberally. And because the assembly may be inclusive of the interconnect, the amount of physical space to deploy resources on has gone from zero to one primary dimension. Access points 102 (FIG. 1A) may be thought of as points, zero-dimensional save for a fixed per-AP platform size. Strips and cables are dimensional, and thus antennas, radios, and other resources can be provided. Indeed, 100 6 in×6 in access points might provide 3,600 square inches of real estate for resources, with a typical spacing of access points being 30 ft. On the other hand, a 3,000 ft long strip at six inches wide would provide 18,000 square inches.

Moreover, most of the space of a traditional deployment (see FIG. 1A) may be wasted, as all antennas in the 6×6 access point may be fundamentally similar if not identical—and the intervening space may be filled with passive Ethernet data cables. In the present technology, the intervening space along a strip may be distinct, and thus offers a linearity of resource options. Thus, a strip may need to only be, for example, an inch wide. If a location is considered to be wirelessly distinct if it is a foot apart from another location, then a 3,000 ft×1 in strip might have 3,000 distinct points compared to only 100 distinct points for 100 6×6 in access points.

Moreover, nothing prevents interconnection topologies from being a tree or mesh as opposed to a daisy chain or linear topology; but, for compactness, this disclosure primarily addresses exemplary linear embodiments.

2. General Overview

Embodiments include systems and methods for providing access to a wireless network. A system embodiment includes a plurality of integrated access points, each with a radio, a controller, and a flexible PCB printed antenna. At least the radio and controller of each respective integrated access point may be assembled on a corresponding rigid assembly board. There may be a means for transmitting radiofrequency signals configured to distribute radiofrequency signals from each rigid assembly board to a respective flexible PCB printed antenna. Each integrated access point may be embedded into a material expanse that integrates the components of the integrated access points. The system may include a unified backplane interconnect, the unified backplane interconnect having a plurality of interconnects communicatively coupled in series, each interconnect connecting adjacent integrated access points. In an embodiment, the distance from the radio of a first integrated access point to the radio of at least one other integrated access point may be at least ten feet.

In an embodiment, the material expanse may be a strip made of flexible PCB, the strip having printed transmission lines that feed power to the components of each integrated access point, and each assembly board being surface mounted onto the strip. In an embodiment, the material expanse may be a strip, and the unified backplane interconnect may include discrete interconnect cables that couple the integrated access points.

In an embodiment, each assembly board may be embedded into a respective built-up strip enclosure comprising a potting, and each strip enclosure might include a foil or a foam in direct contact with each respective assembly board, the foil or foam providing electrical transmission containment. The potting may be a cut foam, a poured foam to fill, a poured epoxy, a poured silicone, or a thermal silicone. The potting may extend beyond built-up strip enclosures and throughout the strip. In an embodiment, each section of a strip between adjacent strip enclosures may be a hollow conduit.

In an embodiment, a unified backplane interconnect may include a head-end configured to receive electrical power and communicate with the wireless network. The head-end may have an External Network to Backplane Converter. The head-end may be coupled to a first integrated access point by a first interconnect.

In an embodiment, a plurality of wireless card modules integrate one or more CPUs and one or more respective Wi-Fi transceivers. In an embodiment, each controller may be a System-on-a-Chip (SoC) configured to transmit and receive Wi-Fi signals.

In an embodiment, each antenna may be selectable and movable. In an embodiment, thermal heat pumps may be embedded into a strip. In an embodiment each assembly board may be tied to a strip. In an embodiment, each assembly board may have thermal pads connected to strips of metal. In an embodiment, a system includes graphite heat spreaders coupled to strip enclosures.

In an embodiment, each assembly board may be encased in a respective rigid case. Each rigid case may be hung from a respective smart cable coupled to the strip.

In an embodiment, flexible PCB printed antennas may be printed on a doubled sided flexible PCB, antenna switches may be surface mounted on the flexible PCB, and at least one of a second foil or a second foam may be laid in a strip adjacent to the flexible PCB. Each double sided flexible PCB may be embedded in a second potting.

In an embodiment, a strip may include flexible stretch restraints or stiffeners. In an embodiment, at least one component of each integrated access point may be encased in a bend-resistant shell.

In an embodiment, each assembly board may have a rigid card and one or more subassembly boards. Each rigid card may include a power supply, a network transceiver, and the respective controller of one of the integrated access points. Each subassembly board may include a Wi-Fi transceiver. The respective rigid card and one or more subassembly boards of each integrated access point may be coupled in series.

In an embodiment, Wi-Fi transceivers may be a radio SoC. In an embodiment, each Wi-Fi transceiver may have a radio module that emits complex analog baseband signals and one or more additional modules that upconvert, switch, and amplify the signals.

In an embodiment, each subassembly board may have at least one of a PCIe switch or one or more PCIe buses. In an embodiment, each subassembly board may include an M.2 or mini-PCIe edge connected rigid card.

In an embodiment, each controller may be a CPU with two USB PHYs, and each interconnect connecting adjacent integrated access points may be a USB cable and a separate power cable. In an embodiment, each CPU includes a DMA engine, one or more cores, and memory, the DMA engine connecting the USB PHYs to the memory.

In an embodiment, each controller may be a CPU, each integrated access point except for a final integrated access point may have a USB Hub, and each interconnect connecting adjacent integrated access points may be a USB cable and a separate power cable. The system may have six or less integrated access points including the final integrated access point.

In an embodiment, each controller may be a CPU. A plurality of integrated access points may include a USB Hub. Each integrated access point that does not have a USB Hub may include a midspan card that terminates a leftmost USB tree and generates a new USB tree. Each interconnect connecting adjacent integrated access points may include a USB cable and a separate power cable. For any series of up to six adjacent integrated access points, at least one integrated access point may include a CPU that comprises a midspan card.

In an embodiment, PCIe lines may be shielded twisted pair cables or twin-axial cables that couple integrated access points. Signal conditioners may amplify or digitally retime the PCIe lines.

In an embodiment, each controller may be a dual-Ethernet CPU with a packet forwarding engine that accelerates local network traffic. Each interconnect connecting adjacent integrated access points may be a USXGMII/XFI one-lane serial connection differential pair routed over a twisted pair cable. Each interconnect connecting adjacent integrated access points may be a USB 3.2 cable carrying USXGMII/XFI signals. The USXGMII/XFI signals may include reference clocks and configuration signals.

In an embodiment, each interconnect may use an Ethernet encoding comprising one of USXGMII/XFI, 40 GBps, 1 Gbps (H)SGMII, 2.5 Gbps (H)SGMII, or 10GBASE-KR.

In an embodiment, each interconnect connecting adjacent integrated access points may be a USB cable carrying PCIe signals.

In an embodiment, each controller may be a CPU with one or more Wi-Fi transceivers, each CPU may be configured to use Wi-Fi as a captive backhaul, and each interconnect connecting adjacent integrated access points may be a coaxial cable. Each coaxial cable may be multiply shielded or wrapped with external shielding. Wi-Fi transceivers may be configured, in scheduling, to switch channels to communicate with different adjacent nodes using at least one of notch filters, high-pass or low-pass filters, flat attenuators, or switches. Each CPU may be configured to perform hop-by-hop traffic bridging. CPUs may be configured to schedule traffic by at least one of coordinated channel changing, attenuator reconfiguration, or transmission timing using at least one of a plurality of ad hoc schedulers, a master scheduler, or a plurality of regional master schedulers.

In an embodiment, the radio of each integrated access point may be a Wi-Fi radio, and each integrated access point may also include at least one of a Bluetooth radio, a Zigbee radio, a Z-Wave radio, or a Thread radio. In an embodiment, at least one radio of each integrated access point may be configured to operate at 2.4 GHz, 3.5 GHz, 5 GHz, or 6 GHz frequency, and at least one other radio of each integrated access point may be configured to operate at 60 GHz frequency or greater. In an embodiment, the radio of each integrated access point may be one of a vector baseband radio or digital baseband radio, and each integrated access point may include at least one other radio.

In an embodiment, at least one assembly board may have a Wi-Fi transceiver, and at least one other assembly board may have a transceiver that is not a Wi-Fi transceiver.

In an embodiment, the components of each integrated access point may include a network transceiver, a power supply, or both. Each assembly board may include a network transceiver, a power supply, or both.

A system embodiment includes a plurality of integrated access points each with a radio, a controller, an antenna, and a USB Hub. Each integrated access point may be embedded into a material expanse that integrates the components of the integrated access points. A unified backplane interconnect may include a plurality of USB interconnect lines. Each USB interconnect line may include a plurality of USB cables. The USB cables may each communicatively couple in series a pair of integrated access points that are not adjacent through one or more USB Hubs. Each USB cable may be a dual shielded twisted pair cable. Each USB cable may be a twin-axial cable.

In an embodiment, each USB interconnect line may include one or more midspan USB signal conditioners. Each USB interconnect line may have a USB signal conditioner integral to or after a first USB Hub.

In an embodiment, the material expanse may be a strip, and the distance from the radio of a first integrated access point to the radio of at least one other integrated access point may be at least ten feet.

In an embodiment, the unified backplane interconnect may include a head-end configured to receive electrical power and communicate with the wireless network, the head-end comprising an External Network to Backplane Converter.

In an embodiment, at least the radio, controller, and USB Hub of each respective integrated access point may be assembled on a corresponding rigid assembly board. The antenna of each integrated access point may be a flexible PCB printed antenna. A means for transmitting radiofrequency may be being configured to distribute radiofrequency signals from each rigid assembly board to a respective antenna.

In an embodiment, the material expanse may be a strip. Each assembly board may be embedded into a respective built-up strip enclosure comprising a potting. Each strip enclosure may include at least one of a foil or foam in direct contact with each respective assembly board, the foil or foam providing electrical transmission containment.

In an embodiment, each assembly board may include a USB signal conditioner. Each assembly board may be coupled to at least one separate signal conditioner card that has a USB signal conditioner. Each USB interconnect line may have one or more midspan USB signal conditioners. Each USB signal conditioner of each separate signal conditioner card may include a retimer, and each midspan USB signal conditioner may include a redriver.

In an embodiment, the radio of each integrated access point may be a Wi-Fi radio, and each integrated access point may also have at least one of a Bluetooth radio, a Zigbee radio, a Z-Wave radio, or a Thread radio. At least one radio of each integrated access point may be configured to operate at 2.4 GHz, 3.5 GHz, 5 GHz, or 6 GHz frequency, and at least one other radio of each integrated access point may be configured to operate at 60 GHz frequency or greater. The radio of each integrated access point may be a vector baseband radio or digital baseband radio, and each integrated access point may also have at least one other radio.

In an embodiment, at least one assembly board may have a Wi-Fi transceiver, and at least one other assembly board may have a transceiver that is not a Wi-Fi transceiver.

In an embodiment, the components of each integrated access point may include a network transceiver, a power supply, or both. Each assembly board may include a network transceiver, a power supply, or both.

A system embodiment may include a plurality of integrated access points each with a radio, a CPU, an antenna, and an off-CPU Ethernet switch. Each integrated access point may be embedded into a material expanse that integrates the components of the integrated access points. At least the radio, CPU, and Ethernet switch of each respective integrated access point may be assembled on a corresponding rigid assembly board. A unified backplane interconnect including one or more Ethernet interconnect lines may connect a pair of integrated access points. Each Ethernet interconnect line may include a plurality of Ethernet cables communicatively coupled in series through one or more off-CPU Ethernet switches.

In an embodiment, the material expanse may be a strip, and the distance from the radio of a first integrated access point to the radio of at least one other integrated access point may be at least ten feet. Each Ethernet interconnect line having at least enough bandwidth to meet the 10GBASE-T standard. Each off-CPU Ethernet switch may have multiple side-to-side Ethernet connections, each off-CPU Ethernet switch being configured to use the side-to-side Ethernet connections through link bonding. Each Ethernet cable may be one of Category 5 or Category 5e cable. Each Ethernet cable may be less than Category 5 Ethernet cable wrapped in ground shielding comprising one of a foil or mesh.

In an embodiment, the antenna of each integrated access point may be a flexible PCB printed antenna. A means for transmitting radiofrequency signals may be configured to distribute radiofrequency signals from each assembly board to a respective antenna.

In an embodiment, the system includes at least two Ethernet interconnect lines, each of the at least two Ethernet interconnect lines only connecting integrated access points that are not adjacent.

In an embodiment, the material expanse may be a strip, each assembly board may be embedded into a respective built-up strip enclosure comprising a potting, and each strip enclosure may include at least one of a foil or foam in direct contact with each respective assembly board, the foil or foam providing electrical transmission containment.

In an embodiment, the radio of each integrated access point may be a Wi-Fi radio, and each integrated access point may also include at least one of a Bluetooth radio, a Zigbee radio, a Z-Wave radio, or a Thread radio. At least one radio of each integrated access point may be configured to operate at 2.4 GHz, 3.5 GHz, 5 GHz, or 6 GHz frequency, and at least one other radio of each integrated access point may be configured to operate at 60 GHz frequency or greater. The radio of each integrated access point may be one of a vector baseband radio or digital baseband radio, and each integrated access point may include at least one other radio. In an embodiment, at least one assembly board may have a Wi-Fi transceiver, and least one other assembly board comprises a transceiver that is not a Wi-Fi transceiver.

In an embodiment, the unified backplane interconnect may include a head-end configured to receive electrical power and communicate with a wireless network. The head-end may include an External Network to Backplane Converter.

In an embodiment, the components of each integrated access point may include a network transceiver, a power supply, or both. Each assembly board may include a network transceiver, a power supply, or both.

3. Structural and Functional Overview

3.1 Integrated Access Point Assembly

Figure 2:
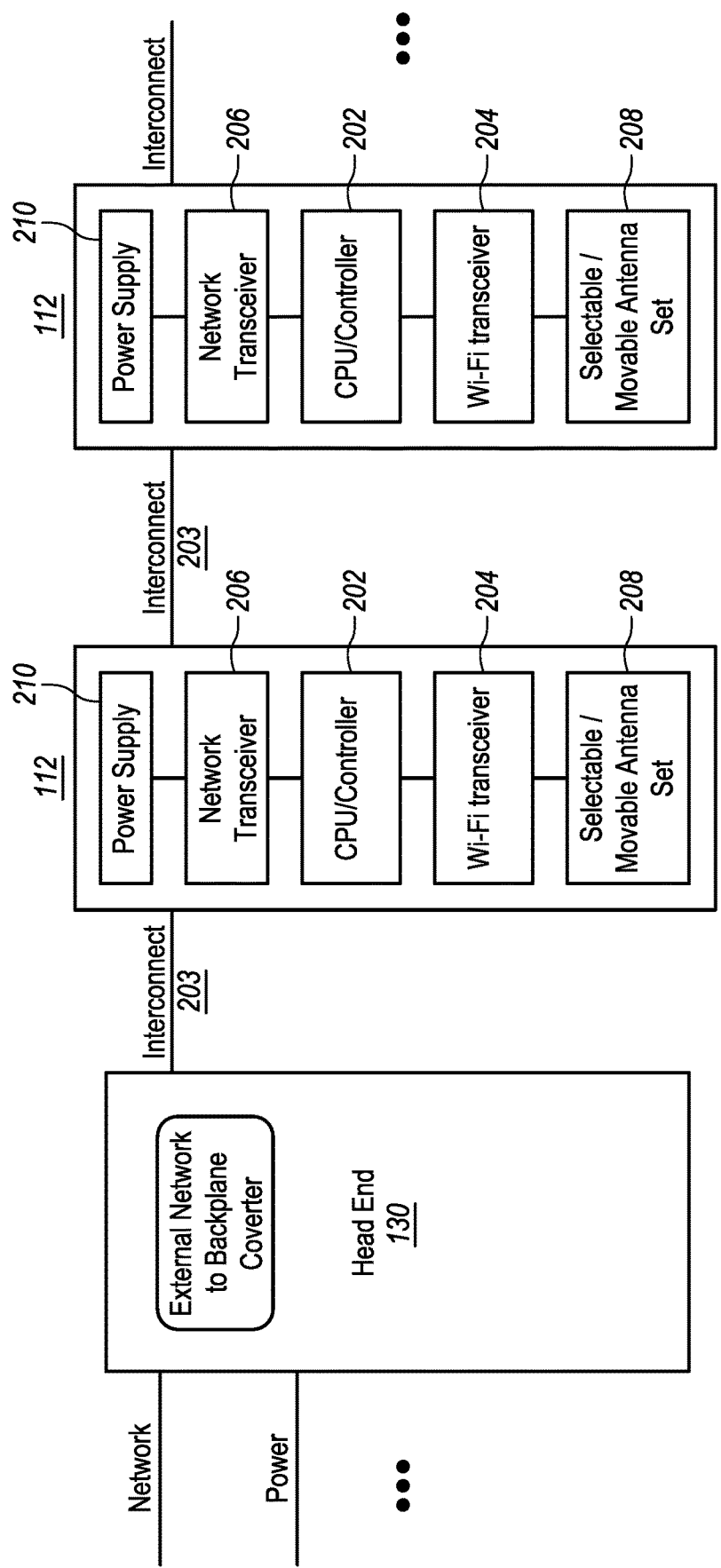
FIG. 2 illustrates the interconnection of multiple CPUs with Wi-Fi transceivers, in an embodiment.

The present technology includes interfaces between radios and CPUs 202, such as in FIG. 2, which illustrates, in one of many embodiments, the interconnection of multiple CPUs 202 with Wi-Fi transceivers 204. Although FIG. 2 shows independent CPUs 202 on each boxed element between interconnects 203, other embodiments may not have this feature. Moreover, in embodiments, another type of controller may be used instead of a CPU 202. Embodiments comprise a power supply 210, which can be any type of power supply configured to power the components of an integrated access point 112 according to the present technology. A bucking regulator and isolating power supply (transformer) is one of many possible examples. Power supplies may act as power converters and can help ensure safety and smoothness requirements are taken care of by a primary strip power supply. Embodiments may also comprise a full fused transformer isolating supply on each card.

In an embodiment, because the presence of a network transceiver 206, CPU 202, and Wi-Fi transceiver 204 may involve the same hardware as expected in a full traditional access point 102 (FIG. 1A) design, one method to physically build a strip comprises taking the parts of a traditional access point 102 design and laying them out again on a form-factor appropriate assembly PCB (which itself may be rigid or flexible), while removing all the unnecessary components and introducing the far smaller components necessary for the disclosed technology.

Figure 3:
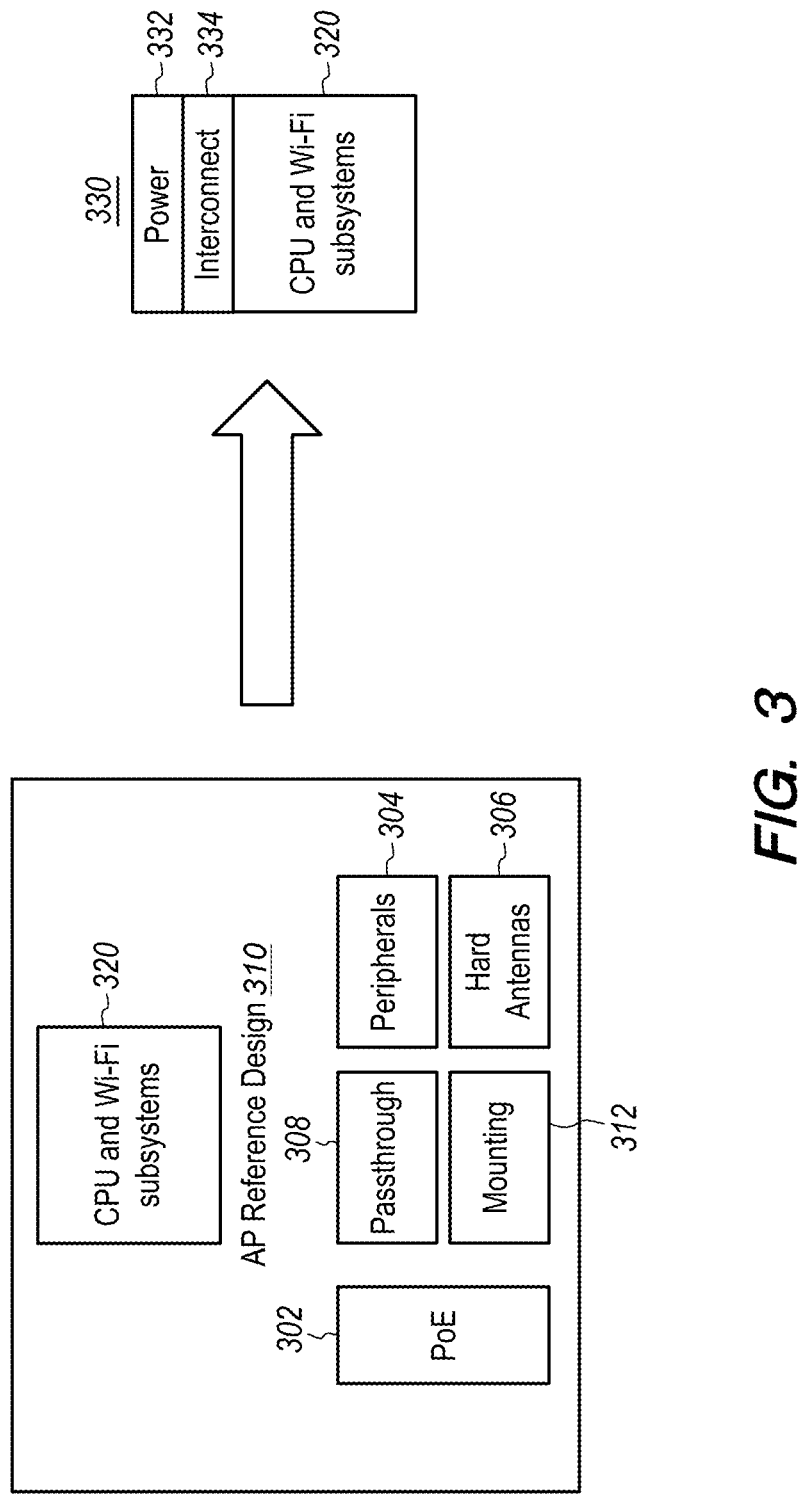
FIG. 3 illustrates a process for building a strip component for use in embodiments of the disclosed technology.

FIG. 3 illustrates such a process for building a strip component 330 for use in embodiments of the disclosed technology. A typical reference design 310 by the vendor of a particular CPU and Wi-Fi subsystem is shown on the left. For some vendors, the CPU and the Wi-Fi transceivers may be separate components; for others, they may be a combined system-on-a-chip (SoC). Along with the CPU and Wi-Fi chips themselves, there may be random access memory, flash, clocks, general-purpose input/output's (GPIO's), and configuration straps, along with elements of power distribution. Outside of the CPU and Wi-Fi subsystems block 320 are other parts that are typically deployed for traditional enterprise access points. Unlike with the embodiments of the present technology, traditional access points may need to derive their power from a discrete power unit (a "wall wart" transformer) or are injected via Power over Ethernet 302 (labeled "PoE"). They may have one or more choices for Ethernet interfaces, including often a smaller number of high speed ports (NGBASE-T or 10BASE-T) and perhaps more lower speed ports (1000BASE-T). These ports are often driven by discrete ports, magnetics, and PHY integrated circuits. Some of these ports may have bridging capabilities, provided by the CPU SoC, for example. Additionally, the access points may have module ports for peripherals 304, such as M.2-style, mini-PCIe, or multiple physical USB ports with power distribution capabilities. The designs may have antenna interfaces 306, with either internal antennas or external antenna ports. The designs may also have passthrough 308 ports for giving access to another device without switching. And the designs may also have components to facilitate mounting 312.

Almost all of the aforementioned components are not needed in embodiments of the present technology, leaving the bare CPU and Wi-Fi subsystem 320 with additional power 332 and interconnect 334 capabilities according to the present technology put in their place. Because of the unique advantages of the present technology, the overall board size may be reduced dramatically (along with necessary peak power consumption), and thus may be miniaturized such that it can be embedded into a flexible strip or hung off of small cases on a smart cable.

In some embodiments, a CPU/Wi-Fi card may be designed as a module. This module can be plugged into an outer carrier board with the remaining components that are needed for a traditional enterprise AP design, thus allowing the card to be reused for both types of form factors shown in FIG. 3. Depending on the module connector, the module may be surface mountable. In some embodiments, a reduced enterprise AP design with only the common ICs between the following form factors are on one module connected by an edge connector. The module and its edge connector may connect to either a traditional enterprise AP main board which carries ICs for interfacing as a normal AP or can be mounted to a strip using a different module. In embodiments, the CPU/Wi-Fi module is designed with the strip needed ports exposed on mid-card pads for surface mounting. In some further embodiments, the remaining part of the card not needed for the strip can be sawed or broken off.

Figure 4:
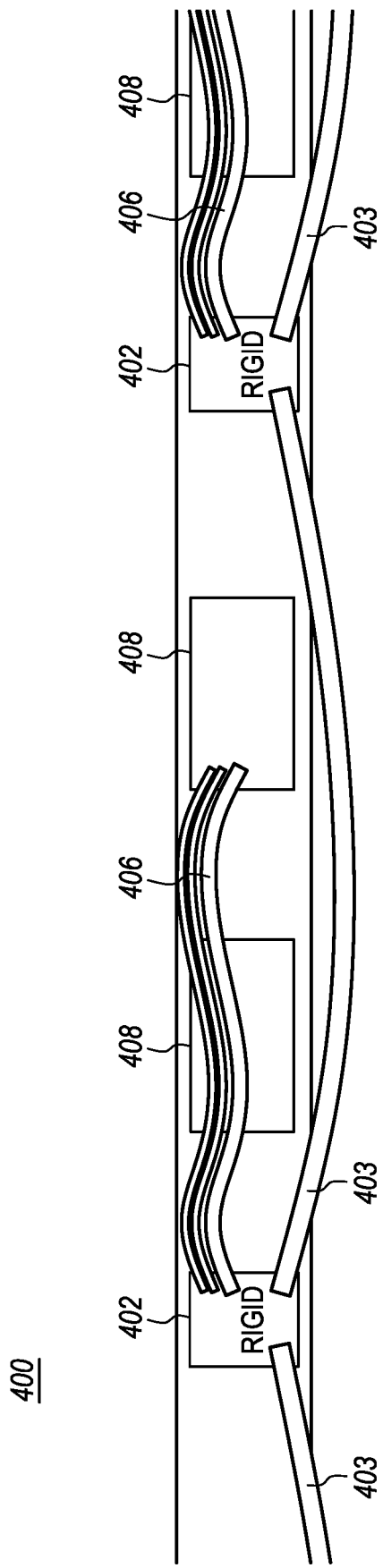
FIG. 4 illustrates a method of connecting assembly boards together into a strip, in an embodiment

FIG. 4 illustrates a method of connecting assembly boards 402 together into a strip 400, in an embodiment. Each assembly board 402 may contain the necessary components to interconnect, operate, and power a radio—in this illustration, each assembly board 402 is the same, but in other embodiments the assembly boards 402 may not be identical. The assembly boards 402 may be the miniaturized boards derived from AP reference designs, or they may be totally new layouts. These assembly boards 402 may be embedded into the strip 400. One method for doing so is to surface mount the assembly boards 402 onto the strip 400, with the strip 400 being flexible PCB with printed transmission lines and similar interconnects to feed the rest of the system. Another method, shown in FIG. 4, is to use discrete cabling, such as an interconnect cable 403 and one or more RF coaxial cables 406 to feed antennas, such as flexible PCB printed antennas 408, using the RF coaxial cables 406 as a distribution system.

Figure 5:
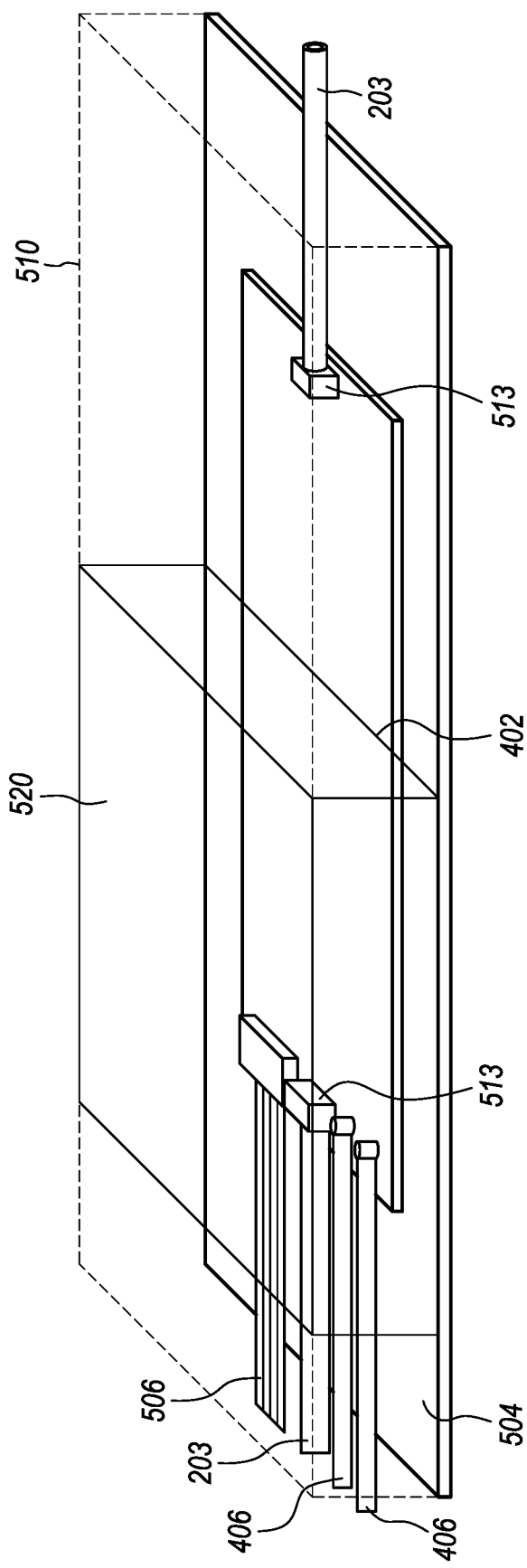
FIG. 5 illustrates a method of embedding an assembly board into a built-up strip enclosure, in an embodiment.

FIG. 5 illustrates a method of embedding an assembly board 402 into a built-up strip enclosure 510, in an embodiment. Overall, in an embodiment, the strip 400 may be made of some flexible bulk material, such as cut foam, poured foam to fill, poured epoxy, poured silicone, or another material. Such flexible bulk material may be referred to as potting 520. In embodiments, the strip 400 may be made of multiple different bulk fills for different areas. In embodiments, portions of the strip 400, or even most of the strip 400, may take the form of a hollow conduit which may not contain any silicone or other potting. The assembly board 402 may be laid, in the embodiment of the FIG. 5, inside the bulk of the strip, with one or more surface materials—shown here as foil 504 to provide electrical emission containment—to which the assembly board 402 is laid. Interconnects 203 are connected to the assembly board 402. These interconnects 203 may depend on a choice of communications interface. Furthermore, how the interconnects 203 bond to an assembly board 402 may vary in embodiments depending on manufacturing desires and may include direct solder via through holes or surface mount or using discrete connectors. Shown in the FIG. 5 is an embodiment using USB—C type connectors 513. For RF, coaxial cables 406 are shown departing the board, and such cables may be soldered or connected via removable connectors such as U.FL. Finally, any other signals that need to arrive at the antennas may be connected to the assembly board via cables as well. Shown in the embodiment of FIG. 5 is a ribbon cable 506, which may carry signals to control antenna switches located on separate flexible PCBs, described below.

The assembly board 402 may be tied to the strip 400 for safety and thermal distribution in some embodiments. In some embodiments, foil or metal strips are connected to thermal pads on the board, to allow heat to be distributed into the foil from the board. The foil may be the same foil 504 as in the surface of the strip 400, or it may be embedded within. The board may be potted, to seal in the board from dust and moisture. In some embodiments, the assembly board 402 is potted in thermal silicone, which conducts the heat away from the board and into the potting 520. The potting 520 may thus continue beyond the board to ensure adequate head distribution. Both techniques may be used in combination. Furthermore, non-potting fill material may also be conductive, at least in part, and thus in some embodiments a multistage thermal dissipation system is used, first close to the board to draw away the bulk of the heat, with secondary and other stages at further distances with less demand for high heat capacity because of the longer areas between hot zones. In some embodiments, additional heat pumps are embedded into the strip 400, near the boards or between stages, to transfer heat. These pumps may be driven thermocouples such as Peltier and other thermoelectric modules, and they may be placed below or above the assembly boards 402, to the sides, or repeatedly along the strip 400. In embodiments, graphite heat spreaders are used to aid in thermal dissipation.

Figure 6:
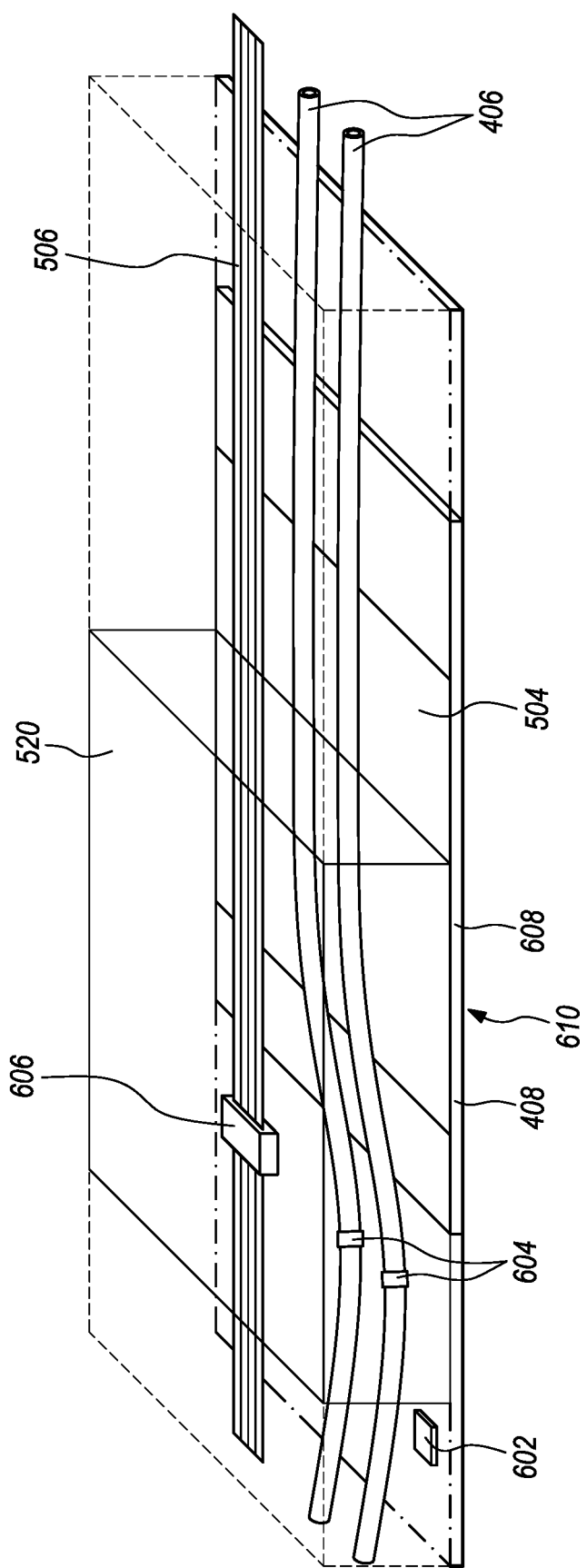
FIG. 6 illustrates the part of a strip where antennas are, in an embodiment.

FIG. 6 illustrates the part of a strip 400 where antennas are, in an embodiment. While interconnect and power distribution features are not illustrated in FIG. 6 to focus on other aspects of the embodiment, they may be expected to be there. Shown in FIG. 6 are flexible PCB printed antennas 408, with the surface antennas facing down. In some embodiments, these flexible PCB printed antennas 408 are protected from the power and interconnect distribution and noise by the same foil 504. The foil may or may not be laid directly on the flexible PCB 610: as shown in FIG. 6, there may be a foam 608 barrier in embodiments. The flexible PCB 610 may be double sided, which allows for antenna switches 602 to be surface mounted on the inside of the strip 400, and thus allows the flexible PCB 610 to be final surface (ignoring smooth radomes, paint or primer or the like). This may ensure a uniform thickness of the strip 400 without the antenna switches 602 acting as bumps, and thus also may avoid having any surface mounted components be at risk of dislodgement.

The coaxial RF distribution cables 406 may be connected or soldered directly to the flexible PCB 610. The coax connection 604 can be a midline connector or can be a tee if to connect directly to a pigtail-type U.FL, for example. The ribbon cable 506 may connect at a ribbon connecter 606 as well, and this may also be done via a double-ended connector, two single-ended connectors with electrical continuity as needed such as on the flexible PCB 610, or soldered such as via surface mounting (mid-cable or end-to-end). Any foam 608 or foil may be breached and sufficiently cleared away to allow the cables to touch down.

In embodiments, the area depicted in FIG. 6 may be potted. As mentioned above, the potting may be the same as or different than what is used for the assembly boards 402.

Additionally, in some embodiments, further face material may be applied on the bottom, top, or thin long sides. In some embodiments, this is plastic tape (such as Kapton), to provide extra uniformity or paintability. In some embodiments, the materials are chosen to allow for a given degree of flexibility, to thus allow the strip 400 to roll for shipping and storage, or to traverse corners upon installation, where the differential between the bottom and top surface stretching can become larger. To protect the strip 400 from being physically damaged by excess pulling, in some embodiments the strip 400 may also be connected with a flexible stretch restraint. This stretch restraint may be rope, strips, or other material. The restraint may take the load when the strip 400 is stretched, to prevent cables and other connectors, as well as other material, from inherently taking a load and potentially causing shearing of solder points or irreparable or detrimental deformation of the strip 400 package. One or more restraints may be used, and they need not be uniform throughout the strip 400, such as to allow for non-uniform flexing restraint by resisting stretching on one face over another. The restraint material may be metal or plastic, woven, bundled, or single stranded, and may be heterogenous. In some embodiments, areas of the strip 400 that must not be pulled or flexed beyond a certain point can be augmented with stiffeners as well. In some embodiments, restraints may be tied to the assembly boards to ensure a minimum safe end-to-end stretch value without causing non-load-bearing material to inadvertently take load and to ensure the spacing of the strip components. In some embodiments, the rigid components may be encased in an additional bend-resistant shell. This shell may be a cage of rigid or flex-resistant material, or a solid material. The shell material may be dense metal, foamed or air-injected metal (such as pot metal), carbon fiber, fiberglass, or any mixture of resin or hardener impregnated materials. In some embodiments, the shell material may be penetration resistant as well, to help avoid errant nails or sharp objects from penetrating. In some embodiments, the shell material may also be thermally conductive, and may participate in heatsinking and be tied to thermal distribution material. In some embodiments, the shell material may act as RF shielding to reduce interference and increase the success of FCC and other electromagnetic inadvertent radiation testing. In some embodiments, the shielding material of the shell is initially nonconductive, but may be made conductive by doping. Some such embodiments may use resin-impregnated material, where the resin is electrically conductive, such as by the addition of fine metal powder. In some embodiments, the plastics may be chosen to be electrically conductive: this may be particularly applicable to carbon fiber/nanotubes or to plastics that can be made conductive similarly (such as with repeated double/single bonds for which pi conductivity may be achieved).

Figure 7:
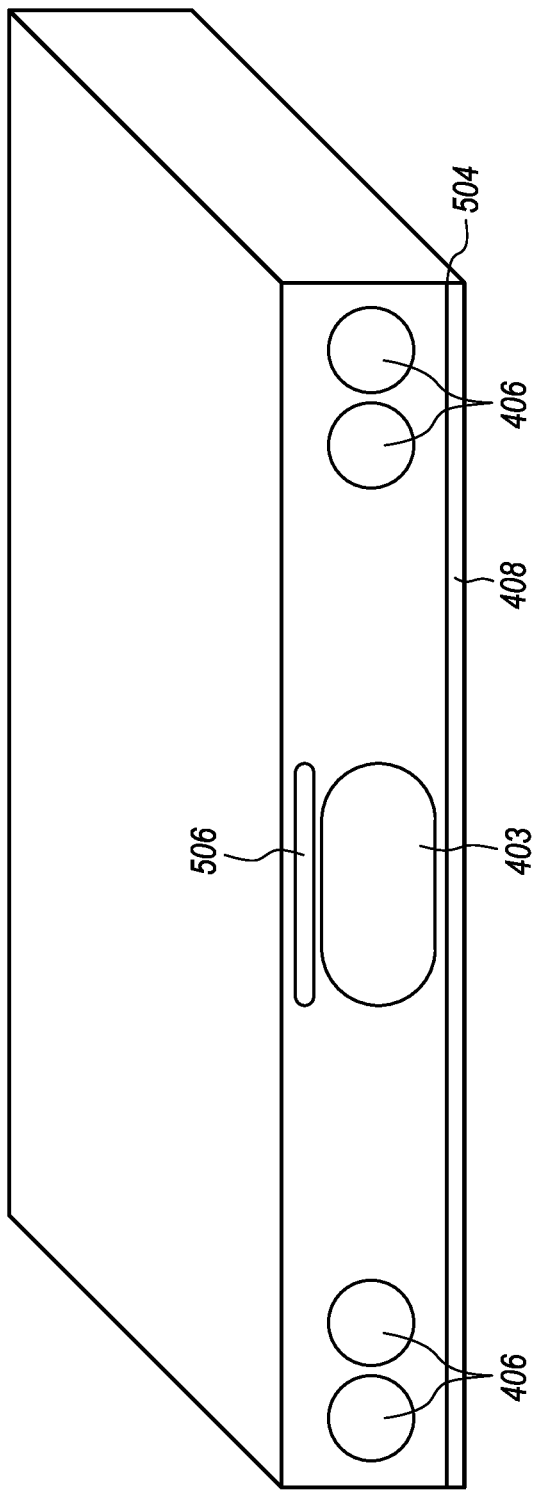
FIG. 7 illustrates a cross-sectional view of a strip, in an embodiment.

FIG. 7 illustrates a cross-sectional view of a strip 400, in an embodiment. The illustration of FIG. 7 depicts how interconnect cables 403 (here showing one, but more may be used), a ribbon cable 506, and coax 406 may be arrayed in the strip 400 bulk. One advantage of flowable fill material is that the internal cables and restraints can be laid down freely, then completely encased in the flowable fill to ensure their locations. However, precut fill may be used, in mix with flowable or entirely as precut, as well, much the same way that foam packaging is precut. In some embodiments, the precut fill is most of the bulk, with adhesives tying it together. In some embodiments, precut fill may be porous to accept impregnation by flowable fill. In some embodiments, the internal structures are held with spacers before filling.

Assembly boards 402 need not be monolithic. In some embodiments, the assembly boards 02 are not "standalone" but are modular subassemblies. This allows for different strip types, or SKUs, to have different capabilities—either across SKUs or even within a strip 400 at different areas—while being made of interchangeable preassembled boards.

Figure 8:
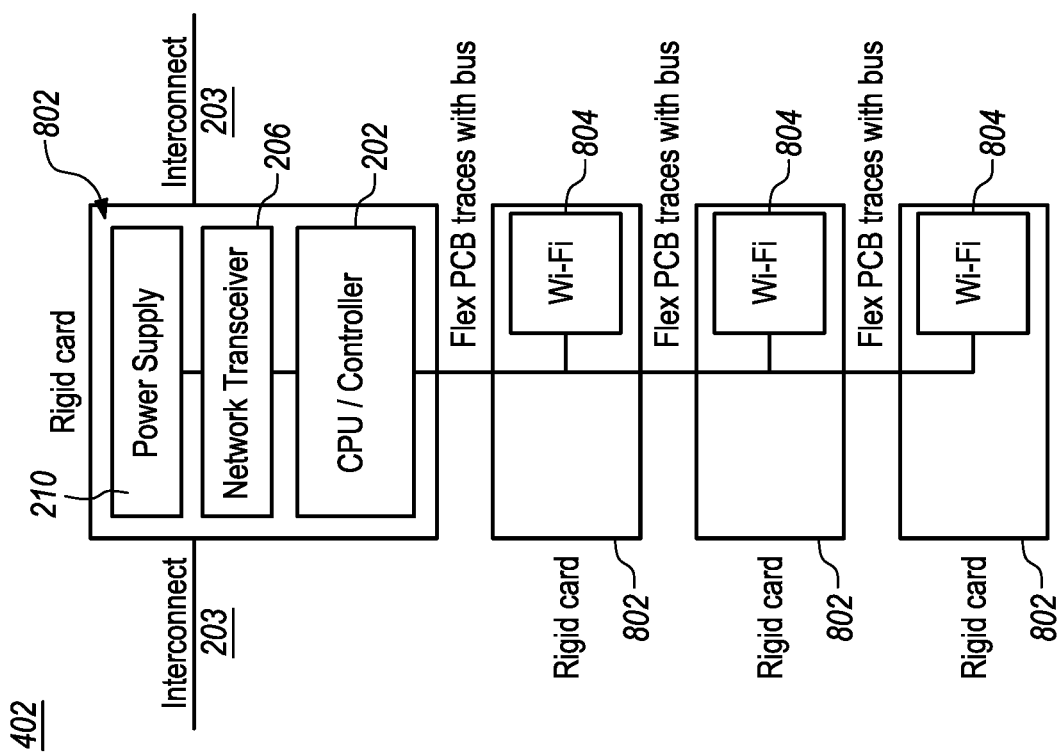
FIG. 8 is a block diagram of subassembly boards that make up an assembly board, in an embodiment.

FIG. 8 is a block diagram of subassembly boards 802 that make up an assembly board 402, in an embodiment. In some architectures, the Wi-Fi components 804 are separate radio units. These radio units can be radio SoCs, meaning usually that they may emit (partially) amplified signals at passband, and may need only minor switching between receive and transmit or additional amplification before broadcast. Or, in other embodiments, they may be separate components, such as a radio module that emits complex analog baseband that is later upconverted to the appropriate center frequency by an additional module before the traditional small front-end modules switch and amplify. In embodiments, radio silicon units use a digital interface—such as PCIe or SDIO—to a CPU or upstream host. In some embodiments, one or more of the subassembly boards 802 comprise rigid cards which are existing commercial modules.

Figure 9A:
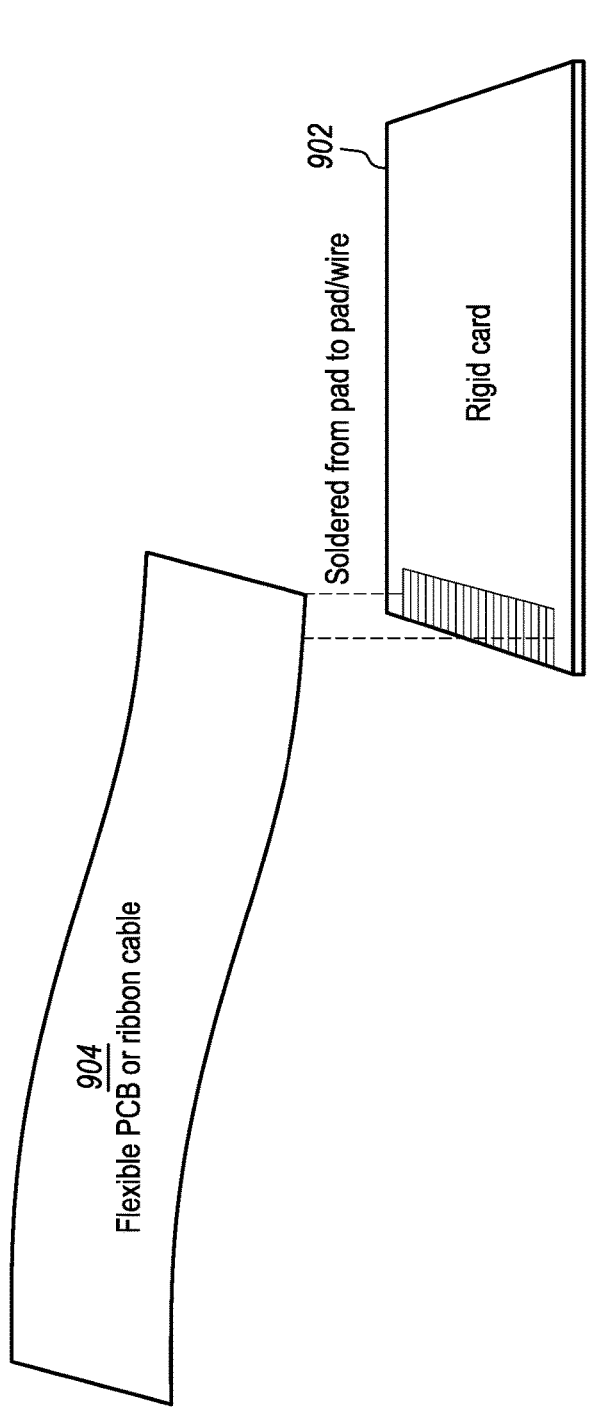
FIGS. 9A and 9B depict embodiments of the present technology which incorporate rigid cards into subassembly boards.
Figure 9B:
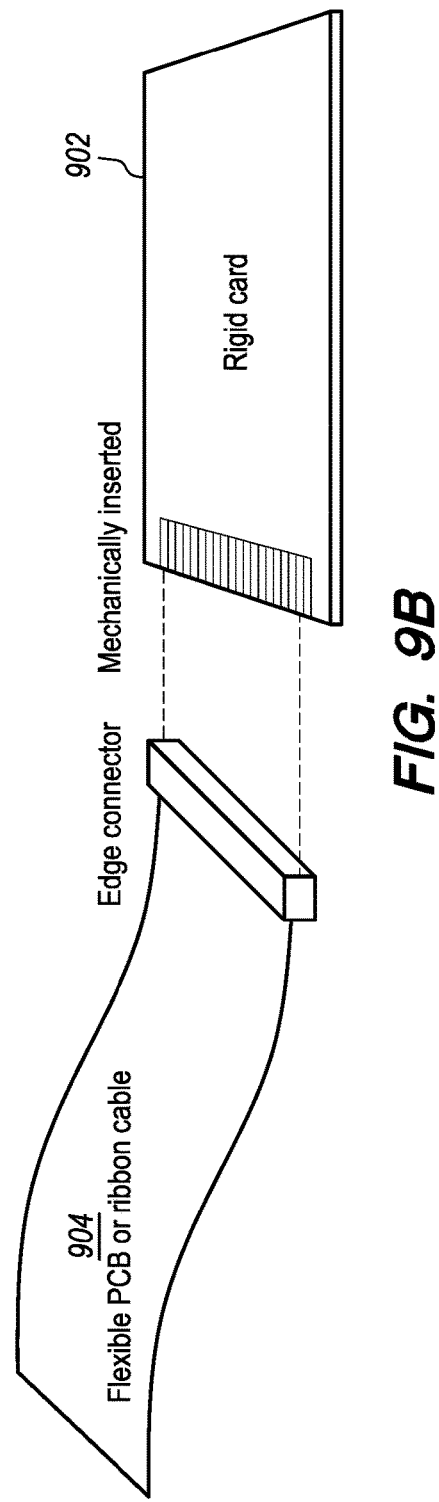

FIGS. 9A and 9B depict embodiments of the present technology which incorporate rigid cards 902 into subassembly boards 802. In embodiments, the rigid cards 902 are M.2 or mini-PCIe edge connected. Some embodiments employ surface soldered flexible PCB runners or ribbon cable 904 to one or both edges of the gold finger layouts on the card edge connectors, thus allowing an existing insertable card to be used in a flexible deployment without modification. In some embodiments, a flexible bus interconnect is soldered to edge mounted mating connectors, allowing unmodified cards to still be assembled without soldering the gold fingers. A possible advantage is that the edge connectors can be slimline, and even be inappropriate for a traditional vertically stacked mounting of daughter cards but can be used against the flexible PCB or ribbon cable 904 in this context, thus saving space.

In some embodiments, lanes of PCIe are brought out of the CPU and to the edge of the assembly card. Separate, each identical, cards carry the Wi-Fi subsystem and require PCIe. (Typical deployments require one lane of PCIe 3.0 or two lanes of PCIe 2.0 speeds.) The cards may be connected to each other using a flexible connection, such as a cable, a separately printed flexible PCB ribbon, or using an underlying flexible PCB that makes up part of the face or bulk of the strip (and thus the modules are surface mounted to it).

In one embodiment, each Wi-Fi card carries a PCIe switch, to carry traffic downstream, as well as to feed the on-board Wi-Fi radio. In another embodiment, each card carries multiple separate PCIe buses, terminating the first for itself and shifting the remaining ones over for downstream, to allow the second daisy-chained card to get its own PCIe bus without requiring the card to be configured. In another embodiment, each bus is passthrough without shifting, and the card itself has final configuration assembly options (such as 0 ohm resistors, mechanical shuts, or solder shunts) to choose the bus. In another embodiment, the cards are the same but the connection cable performs the shift. In another embodiment, the cards are the same but the cable performs a cable select instead of a shift, where each cable (or flexible PCB discrete interconnect) is designed to move the designated cable-specific bus to the "terminal bus in" connectors on the card. In one embodiment, the cards do not perform pass through and are always terminal, and the flexible connections are routed directly to the corresponding multiple bus outputs on the CPU card. Power can also be routed through the connections.

3.2 Interconnects

Figure 10:
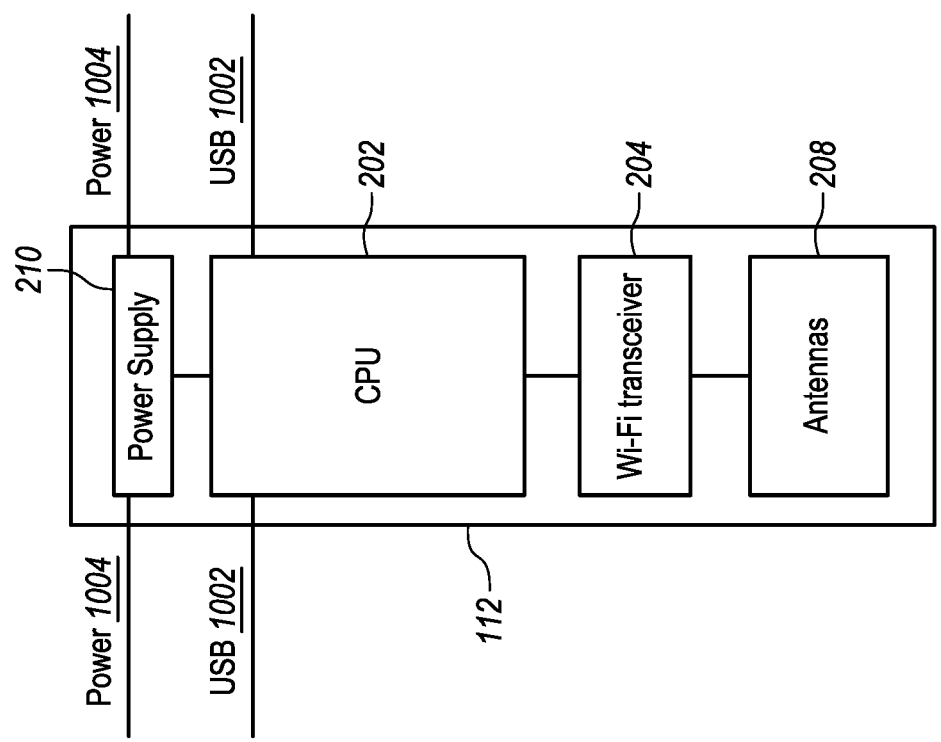
FIG. 10 illustrates an application of point-to-point networking for connecting integrated access points built into a strip, in an embodiment.

The present technology includes embodiments with a number of interconnect possibilities, including point-to-point, addressable backplane, and tappable interconnects (such as shared medium Ethernet). FIG. 10 illustrates an application of point-to-point networking for connecting integrated access points 112 built into a strip 400, in an embodiment. FIG. 10 depicts one example, among many possibilities, which uses a CPU 202 that possesses two USB PHYs on board and creates direct connections between the shown CPU 202 and the CPUs 202 to the left and right of it. The embodiment of FIG. 10 illustrates these side-to-side USB interconnects 1002 as well as side-to-side power interconnects 1004 coupled to an integrated access point 112.

Figure 11:
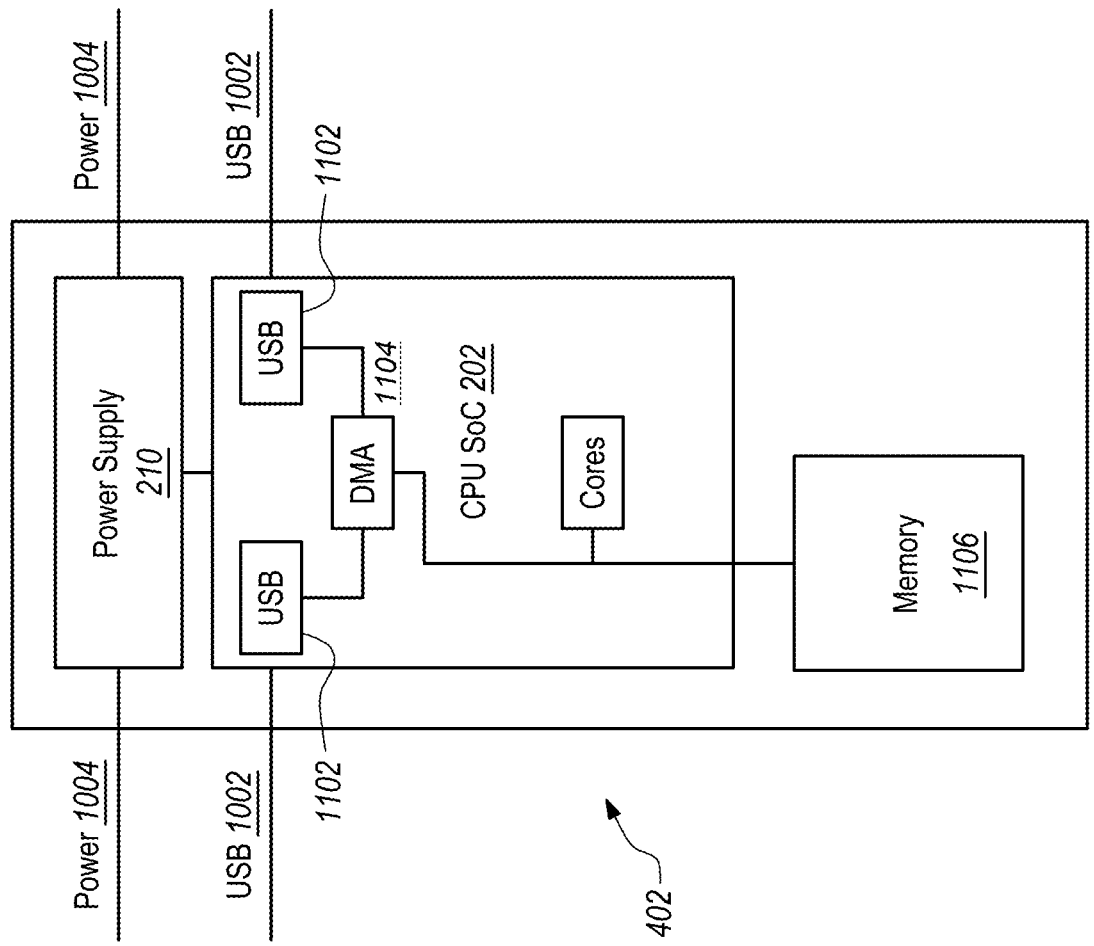
FIG. 11 depicts the architecture for the assembly board used in FIG. 10 in more detail, in an embodiment.

FIG. 11 depicts the architecture for the assembly board 402 used in FIG. 10 in more detail, in an embodiment. Two USB PHYs 1102 are shown, connected through a DMA engine 1104 to the memory 1106 of the CPU 202. USB may specifically require that one endpoint act as a host and the other as a device, though which endpoint acts as the host in the present embodiment may be immaterial: some embodiments may have the downstream CPU 202 from a head-end 130 always act as device; other embodiments may use the USB standard's protocol negotiation to determine.

When operated in termination mode, the CPU's DMA engine 1104 and memory 1106 may be responsible for delivering all through traffic and inserting whatever locally generated upstream traffic or removing any locally consumed downstream traffic. This may increase the memory transaction load, but ensures that the chain may be arbitrarily long, so long as the CPU 202 knows how to route downstream traffic. In some embodiments, the USB devices are operating in bulk transfer mode, and the driver running on the cores ensures that the queues are properly loaded and unloaded, directing traffic from USB to networking or other devices as needed.

Figure 12:
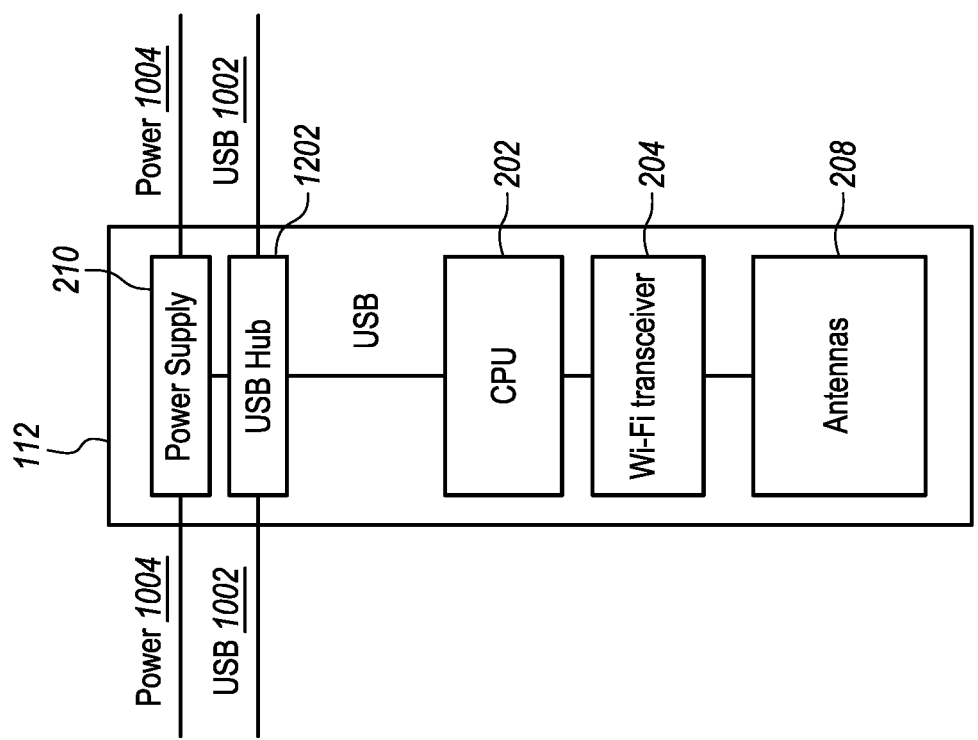
FIG. 12 illustrates an embodiment of an integrated access point using a USB hub.
Figure 13:
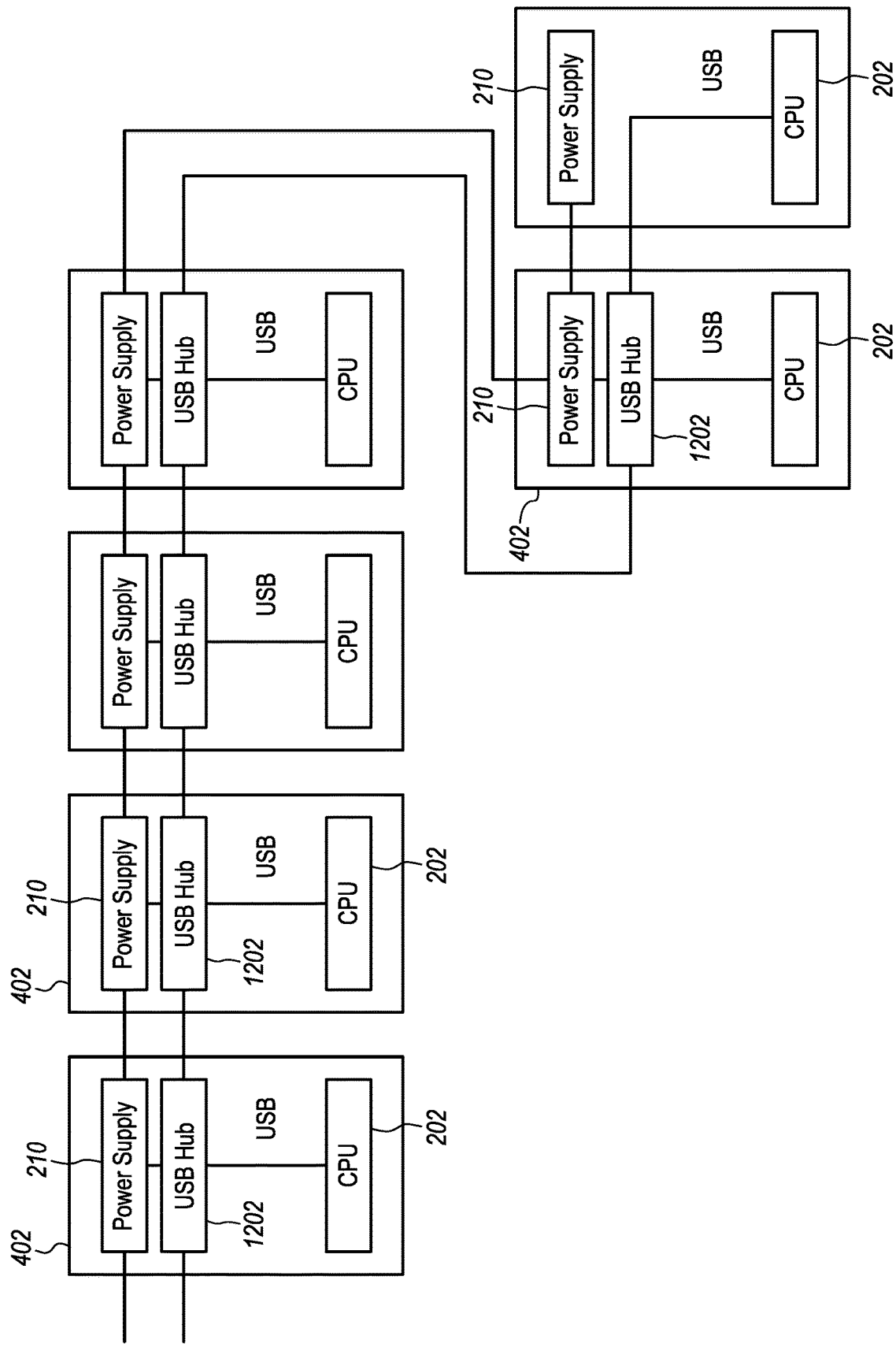
FIG. 13 illustrates maximal USB depth, in embodiments, based on the USB standard.

FIG. 12 illustrates an embodiment of an integrated access point 112 using a USB hub 1202. In this configuration, the CPU 202 is only required to provide one USB port (though it can provide more than one if using slower speeds than the side-to-side USB interconnects 1002, through a USB hub 1202 that will allow dual non-blocking operation). This may free the CPU 202 from handling through traffic. The CPU 202 can be forced to be in USB device mode, and upstream there may need to be a USB root operating as host. One advantage of using the aforementioned hub model is that significant fanout is possible, for tree topologies (over daisy chain). Another advantage is that the CPU 202 can use a lower USB speed, if the USB hub 1202 properly allows for it, than the side-to-side transmission: embedded CPUs may have 5 Gbps USB ports, whereas USB hubs 1202 may be rated for 10 Gbps, 20 Gbps, or more. In some embodiments, the illustrated CPU is a SoC that acts as a controller. In some embodiments, there is a USB host-to-host bridge between the SoC and the USB hub FIG. 13 illustrates maximal USB depth, in strip 400 embodiments, based on the USB standard. USB only allows 5 intermediate hubs, a root, and a final device. This means that a very last CPU 202 must be connected directly and not through a USB hub 1202. This may be accomplished with a card configuration, such as by shunts and bypasses.

Figure 14:
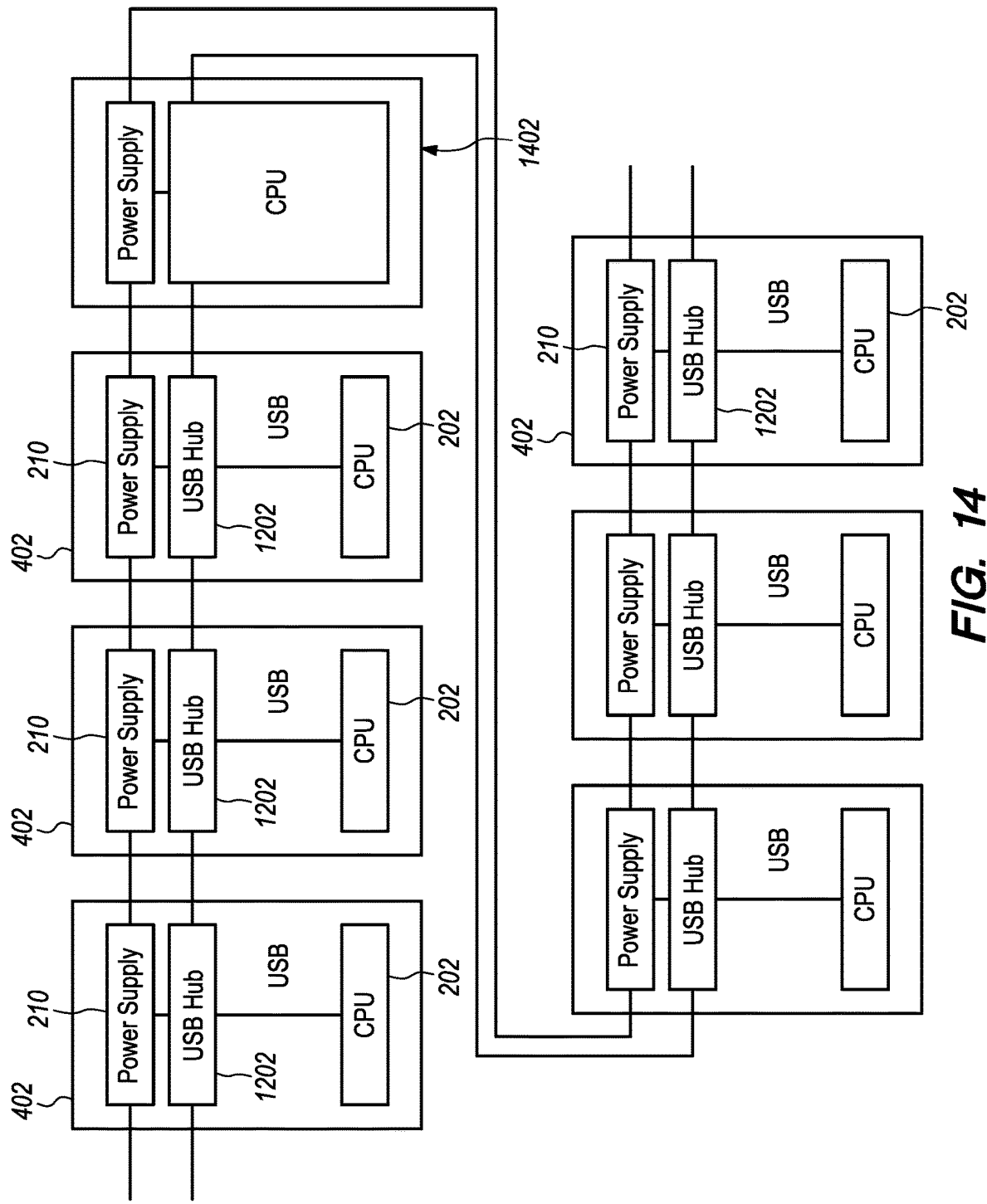
FIG. 14 illustrates a strip embodiment using USB that uses a midspan card.

FIG. 14 illustrates a strip 400 embodiment using USB that uses a midspan card 1402. The midspan card may terminate a leftmost USB tree and generate a new one, to extend the USB depth past six. This midspan card could be a functional wireless unit card as depicted in FIG. 10, or it may be dedicated purely to bridging the USB buses.

Figure 15:
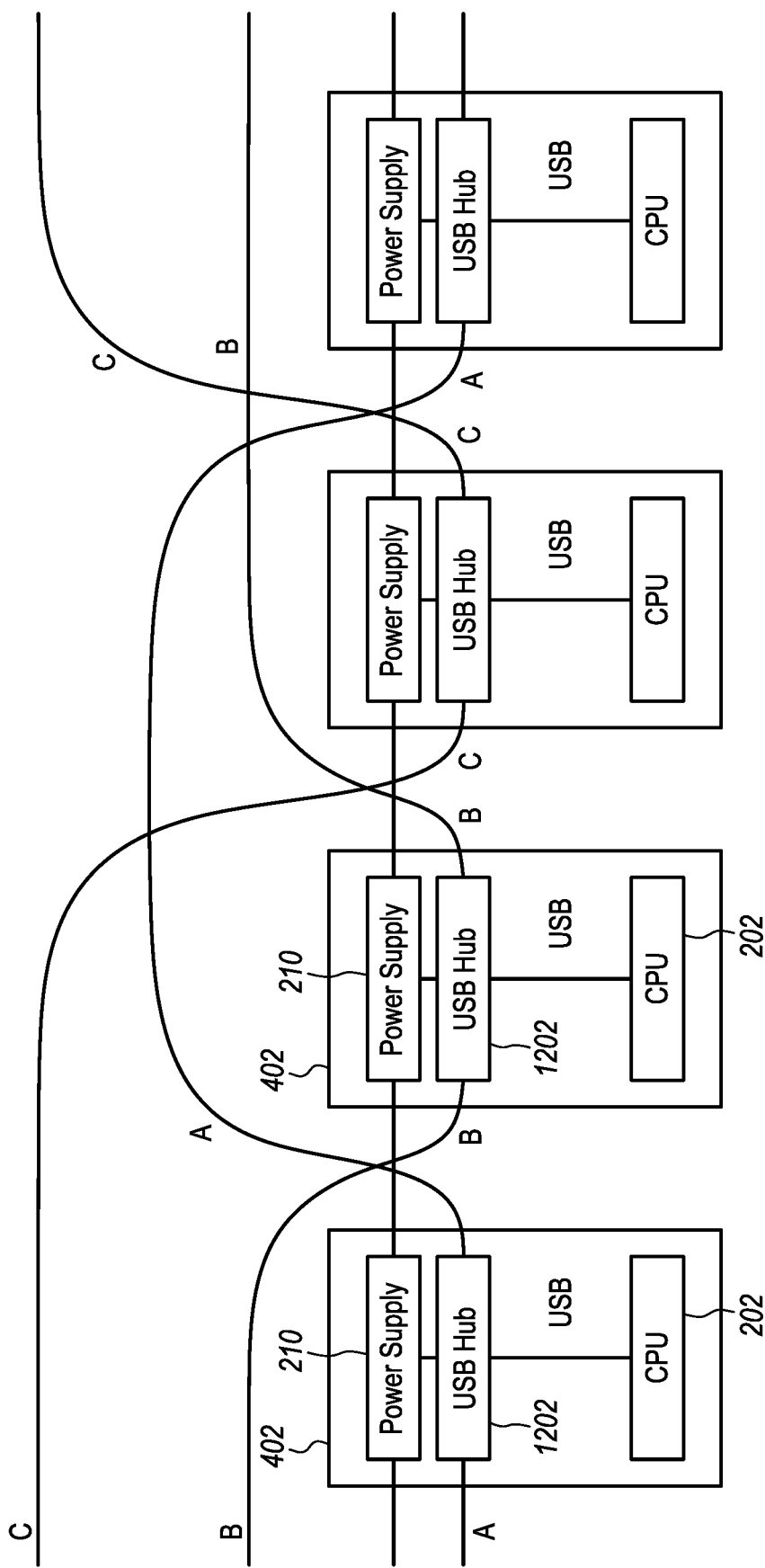
FIG. 15 illustrates a strip embodiment that uses multiple USB lines.

FIG. 15 illustrates a strip 400 embodiment that uses multiple USB lines. Carrying multiple USB lines is another option for extending depth, which may operate by alternating which USB line is intercepted by a USB hub. The patterns and number of lines are arbitrary: here is shown three lines with an ABCABC . . . repeating pattern. The head-end receives the multiple lines, and the strip interleaves the lines. The number of nodes and cables together can allow for efficient reuse if the particular strip is separable or joinable at the ends. For example, with five nodes and four cables, a setup with where each card does a 312 permutation (a rotation) allows the same identical cards to repeat forever (until the end of the USB depth).

This permutation method has other uses than merely increasing the physical length past the depth limitations of USB. Parallel lines may also increase the potential total bandwidth, by interleaving the interconnects 203 through a strip, tree, or mesh. In other embodiments, different interconnect protocols are used, such as PCIe and Ethernet, instead of USB, as discussed below.

Because this mechanically lengthens the distance between USB termination points, USB extension techniques may be needed. USB 3.0 tends to not run well past 1 m on standard cables. Much of this problem is due to attenuation of the cable, though some issues may be due to reflections or cross-talk, leading to increased jitter and receiver eye shrinkage.

Because embodiments use USB as an integrated backplane, the standard for consumer USB products does not limit available extension methods. For example, embodiments may use disaggregated cable bundles, insert midspan or externally powered silicon, not use connectors, and use other techniques that would render the USB to be noncompliant in the context of consumer USB products, but still functional in the present context.

In embodiments, one such method is to use different cables. USB 3.2 Gen 1 and 2×1 can be carried on one lane of dual shielded twisted pair cable. There may be one differential pair in a first shielding, for transmit, and a separate one for receive. These cables may be 24 AWG or narrower, because they may need to coexist with power and USB 2.0 signals. However, shielded twisted pair itself may come in any size, and by terminating the USB 2.0 signal lines and eliminating the circuitry needed to enable plug-and-play, some embodiments may involve directly connecting transmit and receive half-lanes via a larger twisted pair. Some embodiments may instead use twin-axial cable. This is not a trivial change: because the USB standard does not expect cables longer than 1 m for USB 3.2 Gen 1 and far shorter for higher speeds, spanning 2-3 m may require not using off the shelf cables.

Some embodiments may insert signal conditioners. Signal conditioners can be signal redrivers—linear amplifiers or passive analog filters that restore the differential signal strength (peak to peak) and/or emphasize higher frequency components to resharpen the transitions. Some signal conditioners are signal retimers—digital components that extract and reform anew the digital clock and pulses. Some conditioners are passive and powered by the USB cable's power supplied by the host (if those cables are present). Some signal conditioners may require external power.

Figure 16:
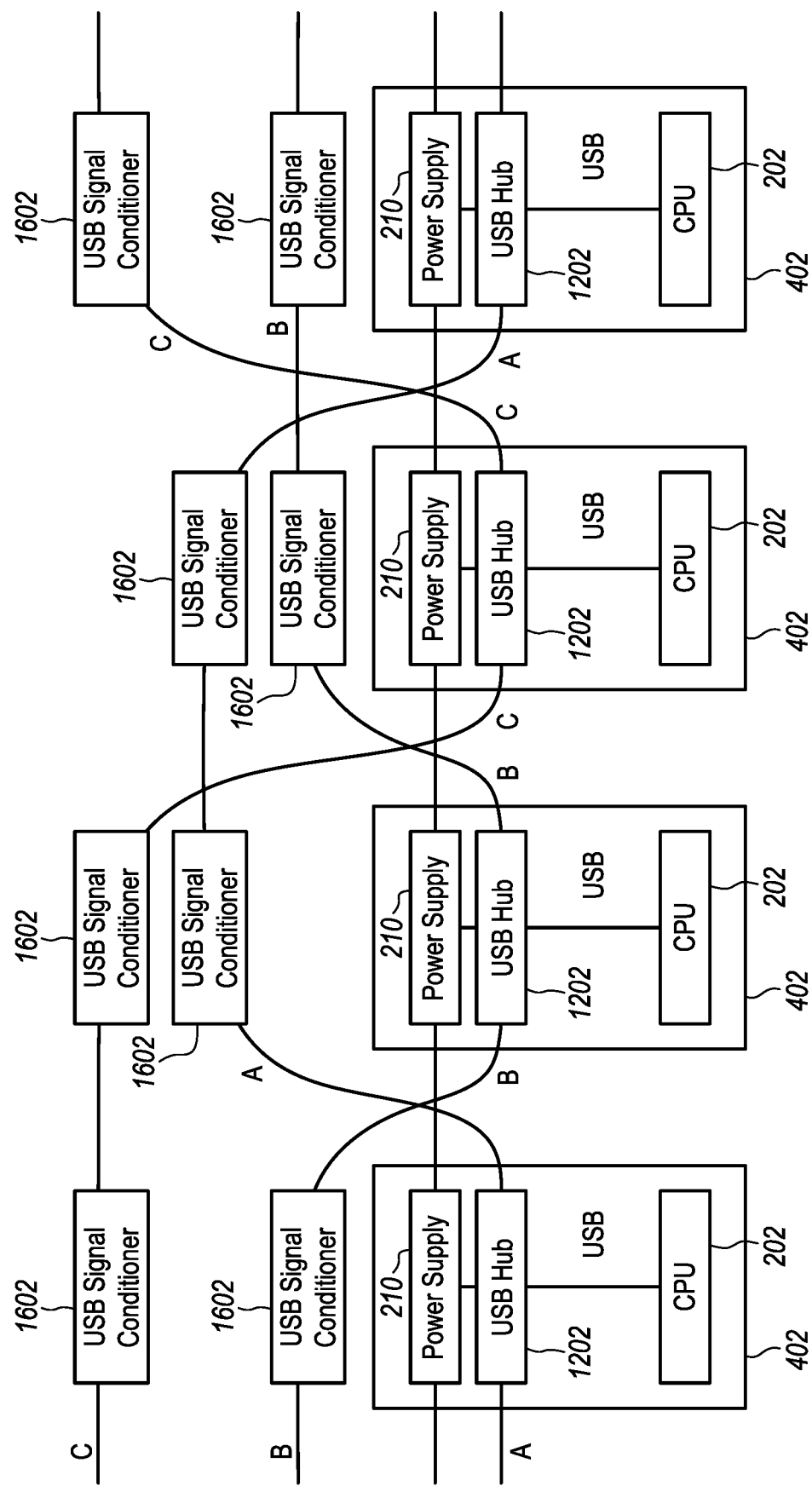
FIG. 16 illustrates USB signal conditioners inserted into side-to-side USB interconnect lines, in an embodiment.

FIG. 16 illustrates USB signal conditioners 1602 inserted into side-to-side USB interconnect 1002 lines, in an embodiment. In embodiments, the USB signal conditioners 1602 are midspan, as is depicted in FIG. 16. In embodiments, these USB signal conditioners 1602 allow the USB backplane to extend across the cards that are skipped in the permutation.

Figure 17:
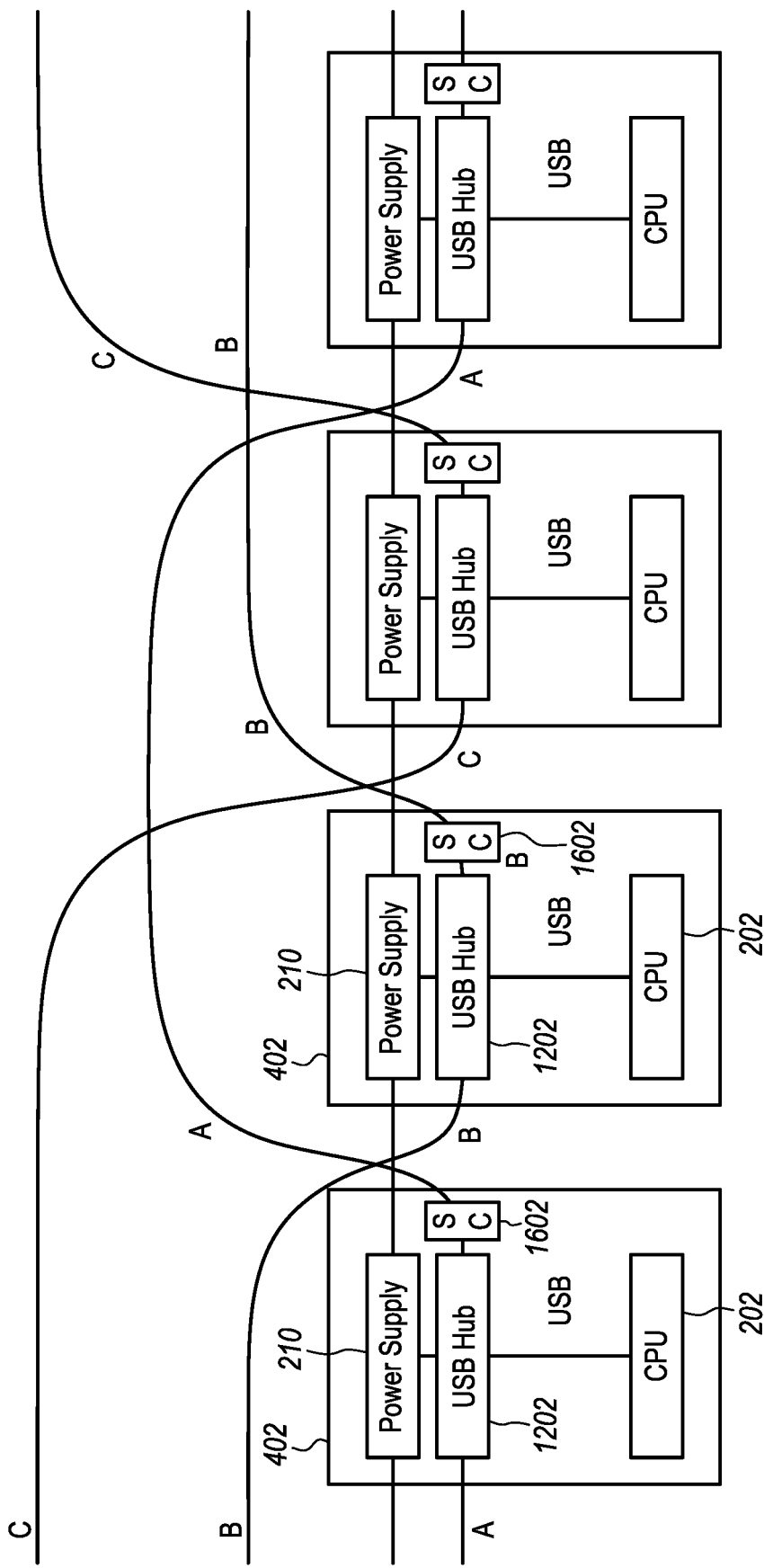
FIG. 17 illustrates an embodiment of a strip using USB signal conditioners

FIG. 17 illustrates an embodiment of a strip 400 using USB signal conditioners 1602 (labeled "SC"). The USB signal conditioners 1602 may be incorporated at the head of each run, such as integral to, or (as shown in FIG. 17) after a local USB device. Midspan conditioners may have different performance aspects, however, as if the signal drops below the conditioner's absolute mV receive cutoff, conditioning may pick up more noise than allowed if performed at the ends, whereas in the middle enough certainty may be maintained by the conditioning.

Figure 18:
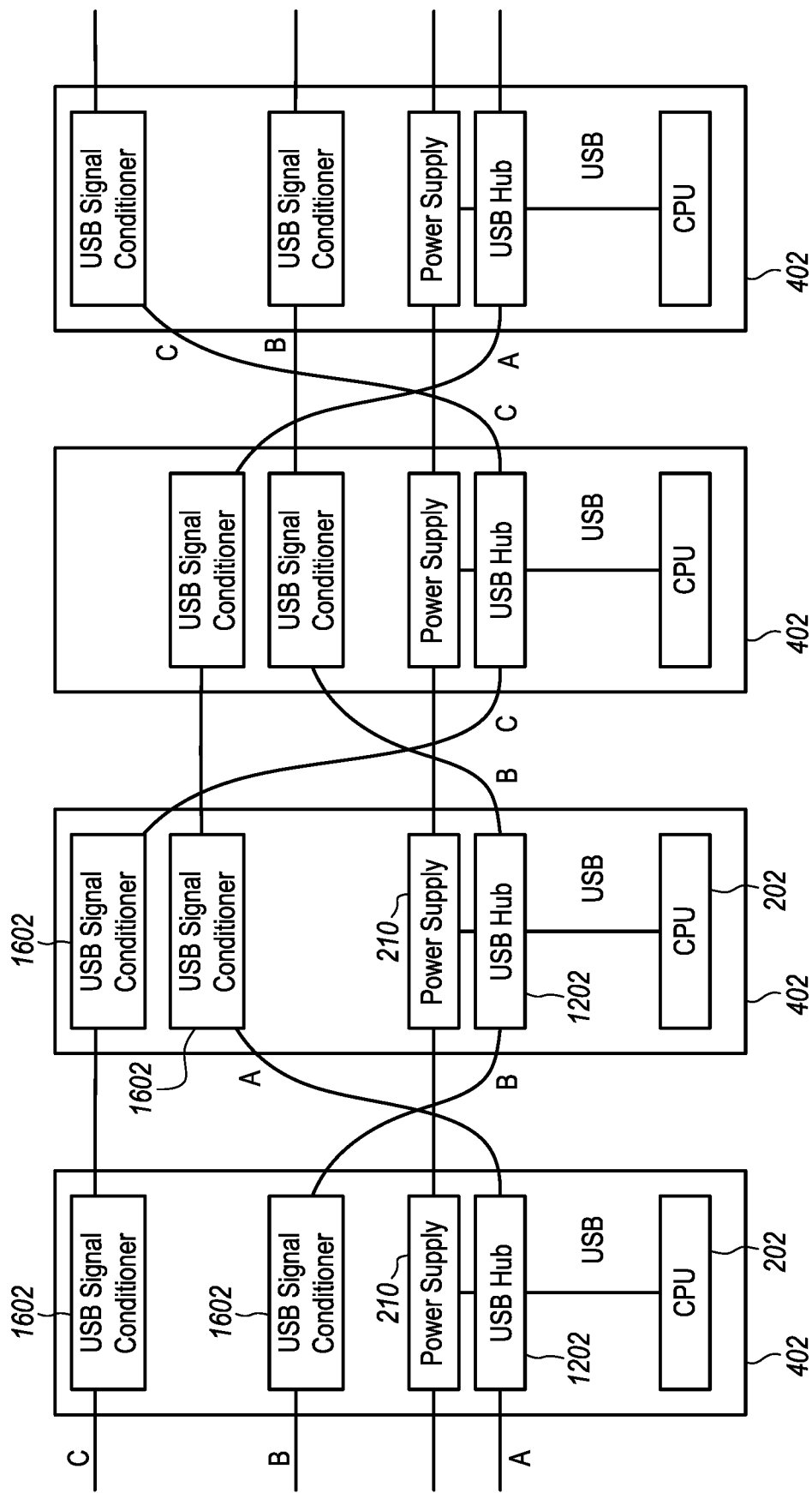
FIG. 18 illustrates an embodiment of a strip where assembly boards comprise USB signal conditioners on the cards themselves.

FIG. 18 illustrates an embodiment of a strip 400 where assembly boards 402 comprise USB signal conditioners 1602 on the cards themselves. By being within the cards themselves, the conditioners are not only assured of being midspan, but may access additional power from the cards, potentially allowing the USB interconnects to avoid carrying power lines entirely.

Figure 19:
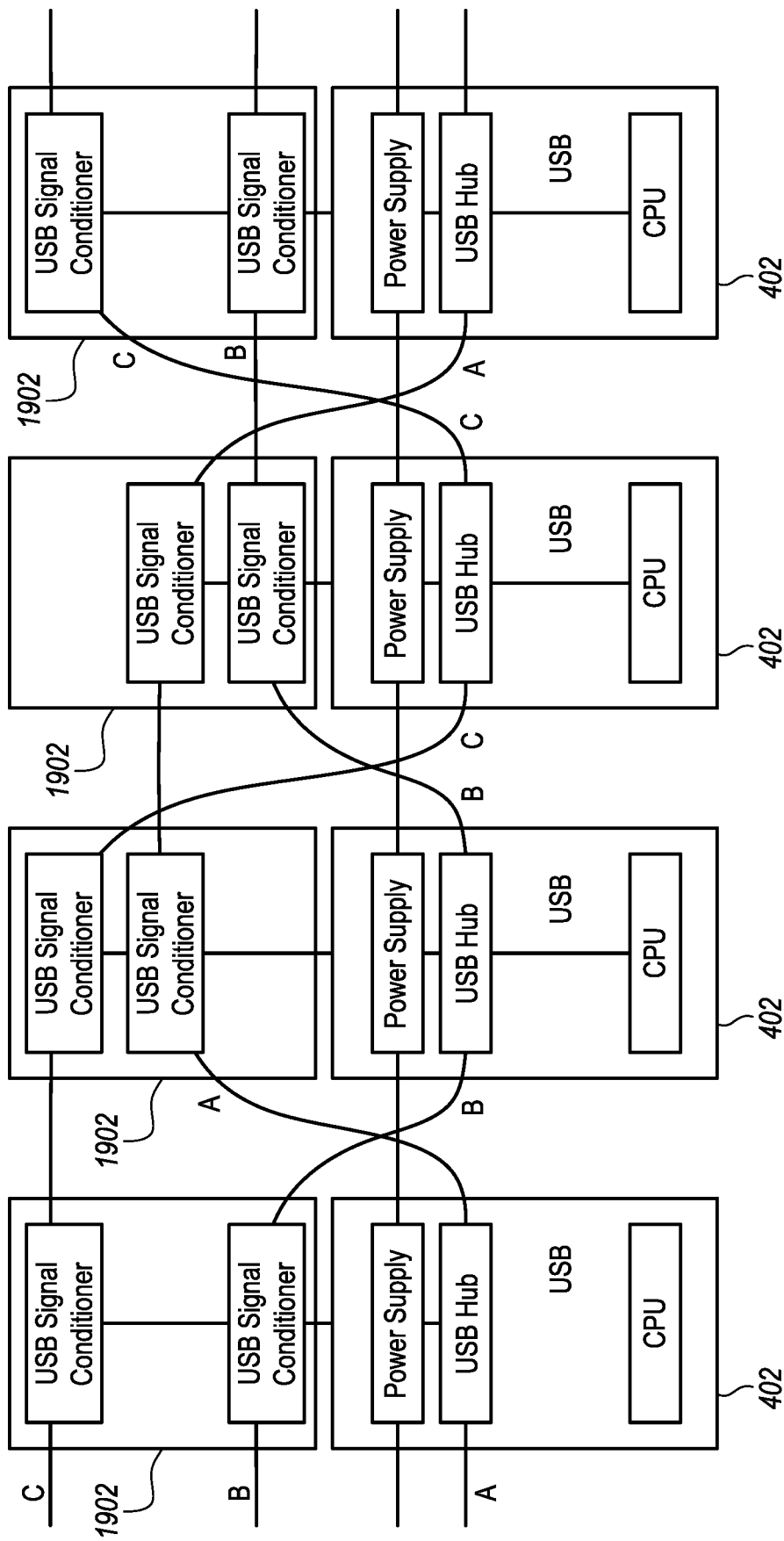
FIG. 19 illustrates an embodiment of a where assembly boards are coupled to separate signal conditioner cards.

FIG. 19 illustrates an embodiment of a strip 400 where assembly boards 402 are coupled to separate signal conditioner cards 1902. In some embodiments, these cards are connected to the power supply of the main cards. In some embodiments, each daughter signal conditioner card carries only one conditioner, and multiple conditioners are connected to the CPU card. This allows the same CPU assemblies to be used for one, two, three, or more parallel USB SKUs, with the difference being in the wiring and the stacking up of conditioners.

In some embodiments, both midline cable and card-mounted signal conditioners are used. In an embodiment, signal regeneration using retimers and redrivers is used, such as with retimers at the cards and redrivers in the cable gaps to amplify. The combination of enhanced cabling (greater than typical gauge wires) and signal conditioners as mentioned can allow for traditionally sub 1 m serial lines to be extended to over 6 m or more.

Figure 20:
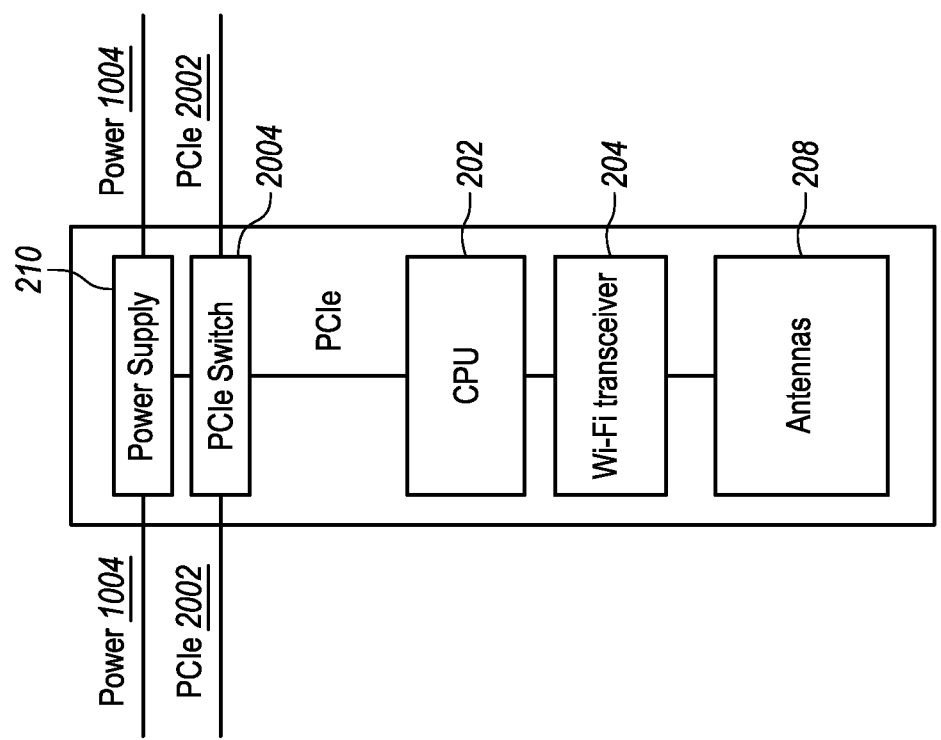
FIGS. 20-22 are each a block diagram of an embodiment of an integrated access point and its context.

FIG. 20 is a block diagram of an integrated access point 112 and its context, in an embodiment. For side-to-side PCIe interconnects 2002, similar embodiments may apply as with side-to-side USB interconnects 1002. In some embodiments, where the CPU 202 exposes multiple PCIe buses that can be independently configured as endpoints and hosts, the CPU 20 may connect to its peers by being a PCIe host in one direction and a PCIe endpoint in the other. Some further embodiments may use PCIe device-to-device DMA to allow the CPU 202 to essentially packet switch the through PCIe traffic not destined to this device. Some embodiments may deploy an external PCIe packet switch 2004, as shown in FIG. 20. This setup may alleviate any possible throughput bottleneck on the PCIe components of the CPU 202, potentially at the tradeoff of added complexity.

PCIe itself is electrically similar to USB 3.2, and as such, signal conditioners exist which can either amplify or digitally retime the PCIe line to allow extension. Typically, PCIe range may be only in the few inches (up to around 30 in), because it is routed on PCB transmission lines or ribbon cable. However, by deemphasizing adherence to the commercial standard, as was discussed for USB, it is possible to route PCIe over shielded twisted pair and twinax cables, to allow for further extension. If there is only one PCIe lane, then the difference in the timings is not an issue either and leads to simpler assemblies. PCIe also may not have the same depth limitations of USB.

Figure 21:
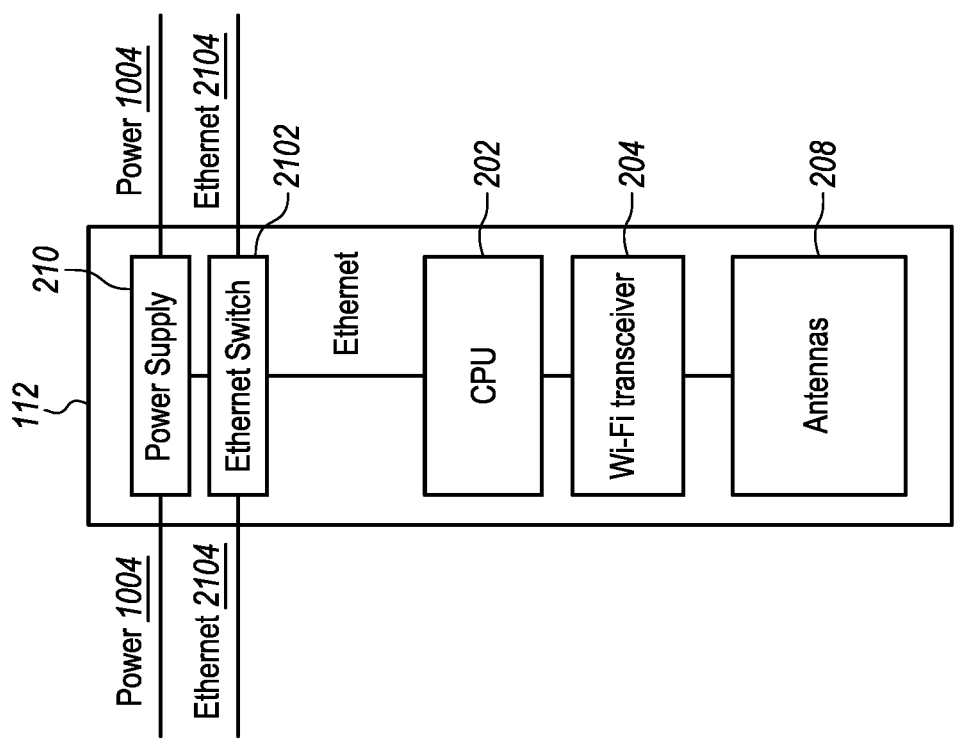

FIG. 21 is a block diagram of an integrated access point 112 and its context, in an embodiment. As shown, Ethernet may also be used as a backplane. This is different than traditional hub-and-spoke access points, in that the daisy chaining allows the use of far less expensive port limited integrated circuits. The embodiment of FIG. 21 illustrates an off-CPU Ethernet switch, side-to-side Ethernet interconnects 2104, and side-to-side power lines 1004 coupled to an integrated access point 112. An advantage of the off-CPU Ethernet switch is that the side-to-side Ethernet interconnects 2104 can be high bandwidth, such as 10GBASE-T or above, while the CPU 202 can use a slower connection. In some embodiments, the Ethernet PHY can be skipped between the CPU 202 and the off-CPU Ethernet switch, further simplifying the connectivity. Although not illustrated, the off-CPU Ethernet switch 2102 itself can have multiple side-to-side Ethernet connections. The off-CPU Ethernet switch can be configured to allow link bonding on the side-to-side connections to use those multiple links.

In embodiments, permutation and shuffling can also be used with Ethernet to increase the parallel capacity of the strip 400, thus dividing the strip 400 into interleaved segments, each segment with the capacity of one Ethernet line, but the strip 400 together with a greater capacity. One possible advantage is that the strip can be designed to maximize uniformity with such interleaving, compared to just segmenting the strip 400 contiguously. For example, if a strip 400 were merely divided into contiguous thirds, then the first third would be closest to the head-end 130, but the last third would be far—perhaps too far for the interconnect signal to go without needing regeneration or retiming. This can be especially true when high data rate signals are running over cables not usually designed for them, or in a way that exceeds their usual specifications, such as with long range serial use of USB, PCIe, or USXGMII/XFI. But this may also be true with twisted-pair Ethernet, if for flexibility, cost, or thickness purposes a category of twisted-pair cable is chosen that would limit the rage compared to the required category used, or if the right category is used but sharper radius bends are allowed for the strip than the cable usually would be expected to tolerate. Category 6A cable, for example, may be used, but it is rather thick and hard to bend. Category 5 cable is much easier to work with, but may have a limited range at 600 MHz, because of its design. In some embodiments, Category 5 or 5e cable may be used, as mentioned; in other embodiments, lower category cable may be used after it is wrapped in grounded shielding, such as foil or mesh, outside the jacket to provide proper isolation while taking advantage of the lower cost and higher flexibility of the lower category cabling.

Figure 22:
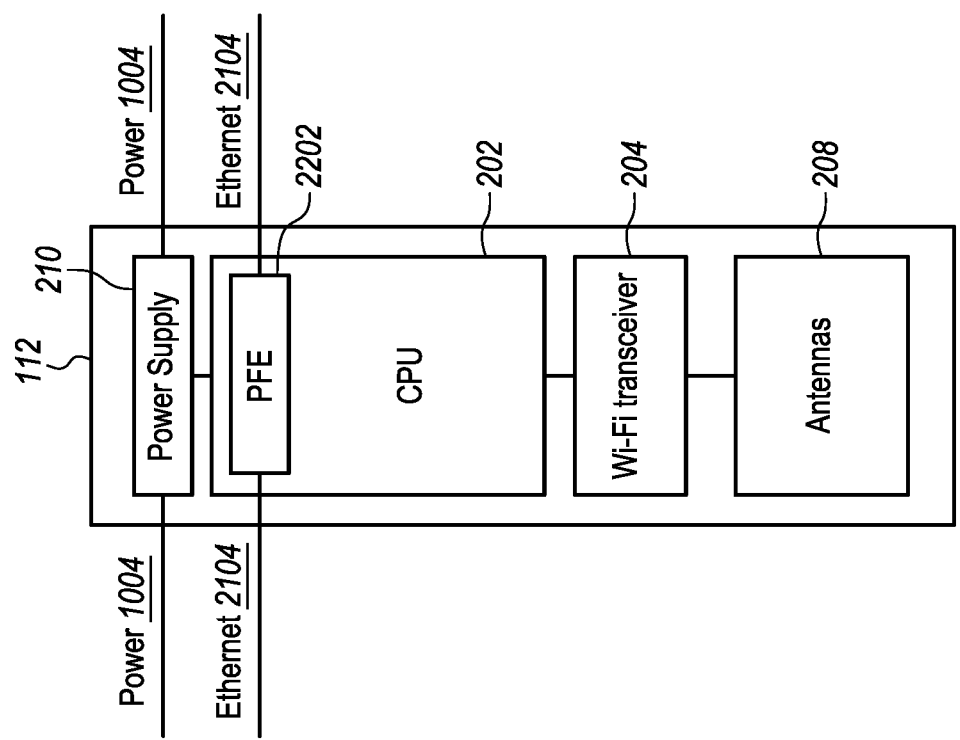

FIG. 22 is a block diagram of an integrated access point 112 and its context, in an embodiment. FIG. 22 shows an embodiment that uses dual-Ethernet CPUs. These CPUs 202 may contain packet forwarding engines 2202 (labeled "PFE") that accelerate through traffic, thus avoiding the memory bus or CPU cores, depending on the CPU chosen. This may allow the CPU software to configure the PFE 2202 as a pass-through switch as needed, thus further unburdening the CPU 202.

However, Ethernet is a particularly heavyweight technology, in the sense that the CPUs with integrated Ethernet may have only the MAC components, and use intervening serial standards to feed a separate, often power hungry and expensive, Ethernet PHY. This may be especially true with 10GBASE.

However, the USXGMII/XFI one-lane serial connections that embedded CPUs often have, to connect to an offchip PHY, are themselves capable of being routed at a distance.

Figure 23:
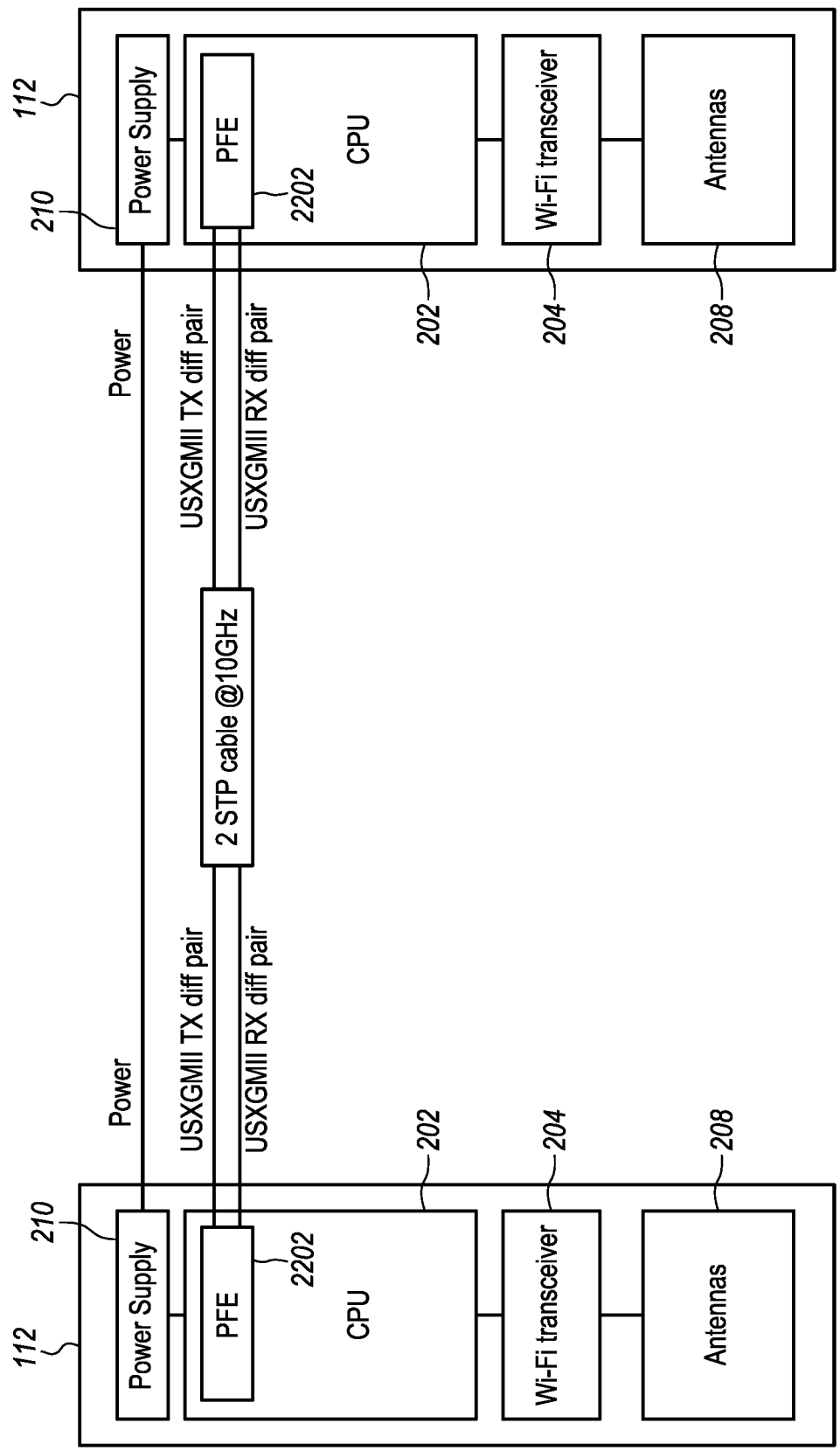
FIG. 23 is a block diagram showing two integrated access points that are interconnected via XFI/USXGMII one-lane serial connections, and their context, in an embodiment.

FIG. 23 is a block diagram showing two integrated access points 112 that are interconnected via USXGMII/XFI one-lane serial connections, and their context, in an embodiment. The USXGMII/XFI differential pairs—one for receive and one for transmit—may be routed over shielded twisted pair cables. Electrically, USXGMII/XFI is very similar to USB 3.2 Gen 2, with similar clock speeds around 10 GHz and voltages.

Figure 24:
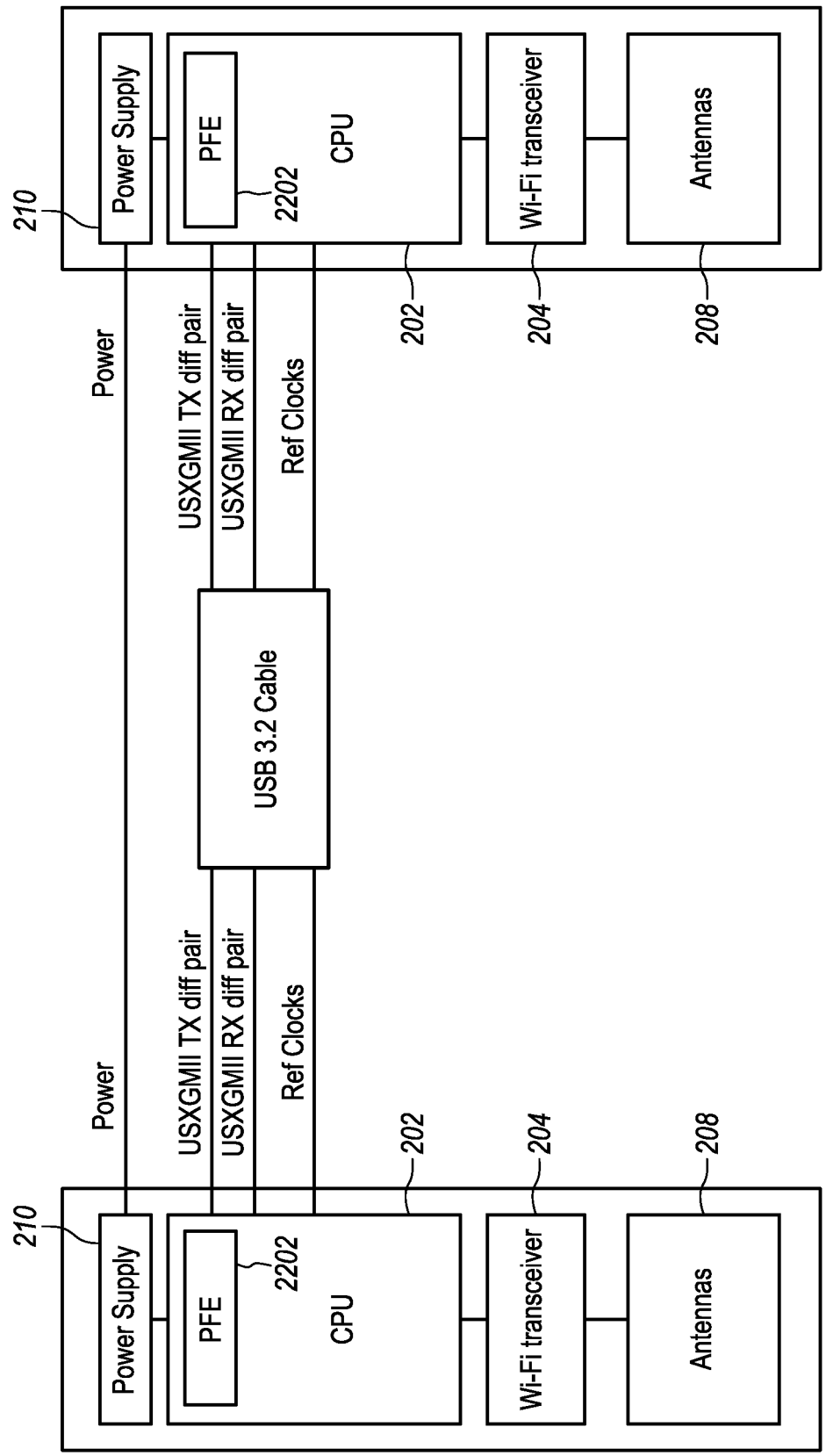
FIG. 24 is a block diagram showing two integrated access points that are interconnected using bulk USB 3.2 cable carrying USXGMII/XFI signals, and their context, in an embodiment.

FIG. 24 is a block diagram showing two integrated access points 112 that are interconnected using bulk USB 3.2 cable carrying USXGMII/XFI signals, and their context, in an embodiment. The cable carries the signals, including the attendant reference clocks and configuration lines, which may be carried on the legacy USB 2.0 signal lines. The extra signals, such as reference clocks and configuration, may or may not need to be carried, depending on the specifications of the CPUs 202. In some embodiments, such signals are regenerated at the receiving side. The reference clocks may not need to be carried across the interconnect, as they are typically used to train the receivers and the serial protocol may be self-clocking. Some CPU 202 or software driver implementations will still require configuration lines to be exercised as if the CPU 202 were communicating with a local PHY. These GPIOs or two-wire MDIOs may be carried across the cable in some embodiments. In other embodiments, they are terminated and regenerated locally: some further embodiments use other GPIOs to drive the GPIOs in question, which can be needed for CPUs with hardwired GPIO controls when set to 10GBASE-T mode. Specifically, for standard MII, the MDIO interface is used for programming PHY registers, usually to set data rates, determine status, and interface with link layer protocols. In some CPUs or Ethernet MACs, the MDIO interface can be ignored, and the driver can force frames in and out. The choices depend on the capabilities of the MAC: in some embodiments, again, this may be done by adopting a backplane mode where negotiation is not a part of the protocol, such as 10GBASE-KR. In other embodiments, this may be done by terminating or floating the MDIO lines and letting the driver set registers to ignore/override the PHY MDIO "errors". In other embodiments, this may be done by using GPIOs to emulate the PHY, which allows the host software to completely control the hardware on both "ends", one emulated.

Multiple lanes in each direction may be carried as described above. The cable itself may be doubled or more USB 3.2 cables or can be bundles of shielded twisted pair or twinax, among other cables. In some embodiments, the number of lanes varies between nodes, thus allowing some backbones of an interconnect (such as a thick tree or mesh) to perform internal aggregation functions.

An advantage of using Ethernet this way is to avoid needing expensive and power consuming data-center grade ICs for performing edge connectivity.

Embodiments may use other Ethernet encodings, including 40 GBps, or 1 or 2.5 Gbps (H)SGMII, rather than USXGMII/XFI. The differences between the Ethernet MAC/PHY interconnects includes the number of lanes and the MDIO interfaces, and MDIO interfaces, as discussed, may be terminated locally or forcibly driven.

Other embodiments use 10GBASE-KR or similar backplane Ethernet, rather than USXGMII/XFI. A possible advantage is that backplane Ethernet has no assumptions about an external PHY, as it is made to be MAC to MAC, and in some cases the CPU's SerDes module can support backplane Ethernet using minor configuration adjustments. Otherwise, electrically, the serial lines are similar. (Note that by "similar", the signals may differ in their specifications for allowed jitter, voltage swing, preemphasis, equalization parameters, or other tuning, but that fundamentally the serial lines operate similarly and thus can be accommodated using the same methods. Higher level protocol negotiation and such may be different). With backplane Ethernet, any negotiation is typically done over the data lanes and not a separate bus, and so allow the one (or more) SerDes lanes used for data exchange straight of most embedded CPUs to be used directly over STP or twinax (per direction per lane) without the side cables. Nonetheless, raw USB 3 or USB-C cabling have available lines.

Some embodiments use PCIe over USB or similar cable. PCIe requires various signal and clocking lines, and there are plenty of free wires available. Some care may need to be taken if the clock is transmitted rather than regenerated locally. Nevertheless, by using non-standard cabling interfaces, the PCIe can be hardwired and the "pluggability" requirements of the standard, to a large extent, ignored. This is one reason why the extension mechanisms discussed above can extend PCIe far beyond typical backplane distances. Additionally, some embodiments use PCIe signal conditioners (such as redrivers or retimers) to add to the maximum distance. Some embodiments use SATA as above.

Figure 25:
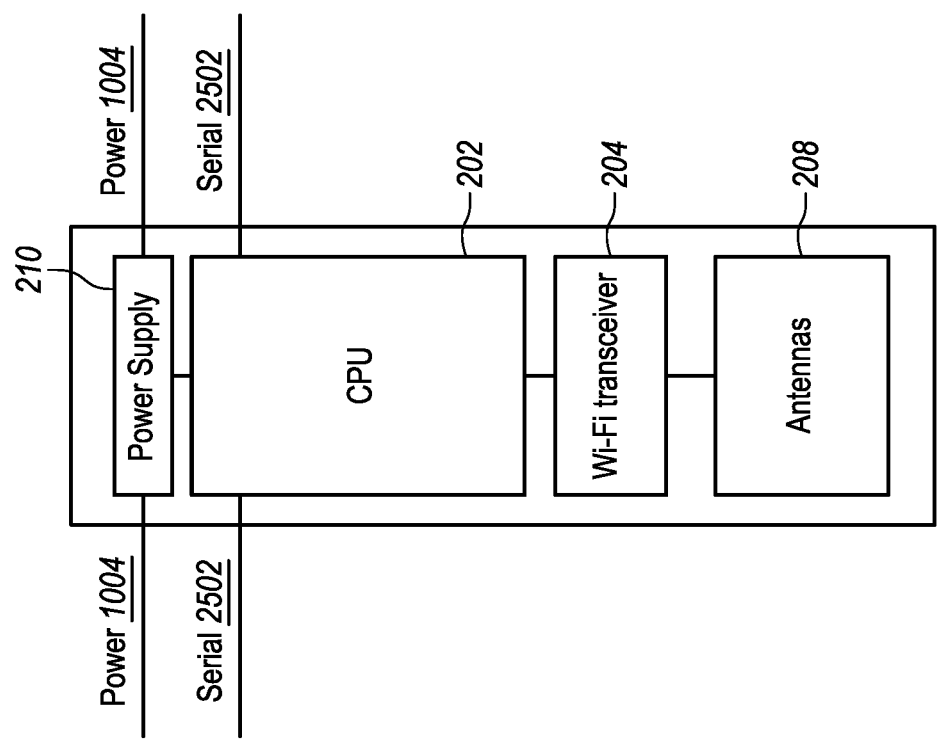
FIG. 25 is a block diagram of an integrated access point and its context, in an embodiment.

FIG. 25 is a block diagram of an integrated access point 112 and its context, in an embodiment. The embodiment of FIG. 25 illustrates side-to-side Serial interconnects 2502, and side-to-side power lines 1004 coupled to an integrated access point 112. FIG. 25 depicts a generic serial interface, used by configuring the SerDes blocks in configurable CPUs 202. Such a configuration is a generalization of embodiments described above, and because most SerDes blocks are designed for the above signaling protocols, the electrical characteristics (input and output differential voltages and such) may be similar. Many CPUs 202 come with partially customizable SerDes functions. Often, the SerDes speed itself is set in one function, and then mapped by another function to a higher-level protocol. In some embodiments, a convenient higher-level protocol (such as PCIe or an Ethernet one) is chosen, but the SerDes is set to a nonconforming value for that protocol (such as requesting PCIe on a 10.325 Gbaud clock). The choices of higher-level protocol to SerDes mapping can be made based on capabilities of the hardware and the convenience of the software programmer. For example, some CPUs 202 with SerDes allow for a 5GBASE-T one-lane SGMII configuration on the SerDes, but only a 1000BASE-KX backplane. In some of those CPUs 202, it is possible to configure the SerDes to 1000BASE-KX, thus allowing the driver to program an on-chip MDIO register bank and thus configure the backplane PHY to set the rate and disable autonegotiation (whereas with 5GBASE-T, an off-chip PHY is needed with an external MDIO driven by the CPU 202)—but then to configure the SerDes clock to the 5 Gbps rate. Such an embodiment may not be compliant with 1000BASE-KX, but two CPUs 202 configured this way and paired on the same SerDes line will communicate at the higher data rate. These nontraditional configurations can allow the SerDes to be used for higher-bandwidth chip-to-chip communication at a distance.

Figure 26:
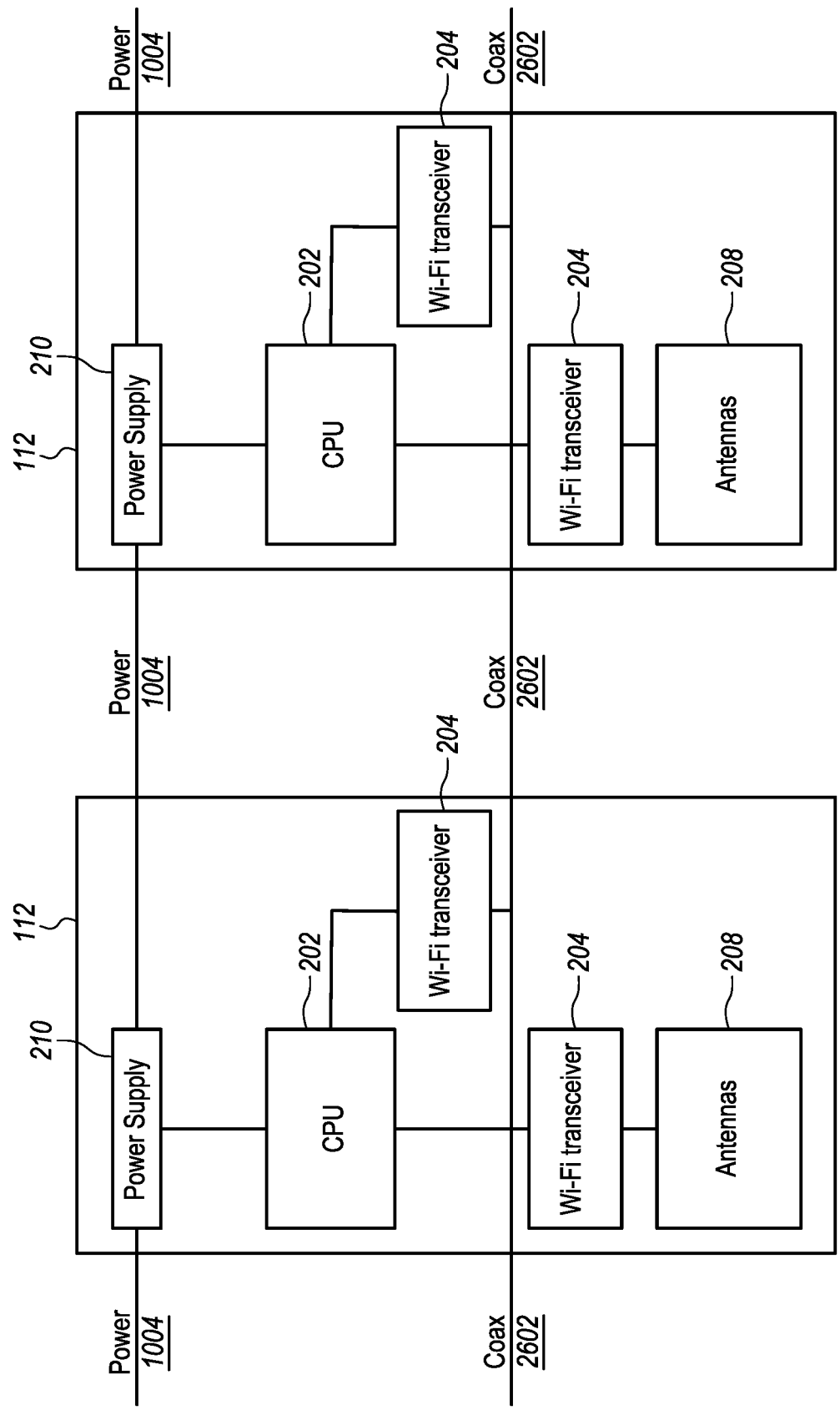
FIG. 26 is a block diagram showing two integrated access points that are interconnected using coaxial cable, and their context, in an embodiment.

FIG. 26 is a block diagram showing two integrated access points 112 that are interconnected using coaxial cable, and their context, in an embodiment. FIG. 26 illustrates using Wi-Fi itself as a backhaul, but captive. Because many commercially available Wi-Fi CPU combos have excess transceivers which can outperform other connectivity modes they possess, it is possible to directly coax together transceivers to allow a wired connectivity mode. In some embodiments, the final power amplifier can be omitted. In some embodiments, the captive Wi-Fi transceivers are configured to tap to a common coaxial cable 2602. Some further embodiments tune the transmit power or insert attenuators to limit the transmission range to the neighboring transceivers only. Some embodiments use OFDMA/MU-MIMO to split the access on a card to use half the channel to go left and half to go right. An advantage of doing so is that a transceiver in the middle of two or more others can talk to its nearest neighbors at the same time, and yet, as mentioned, proper in-line attenuators can ensure that greater-than-two collisions are reduced or eliminated. BSS coloring and dual NAV may both be effective in these cases as well. One of the possible purposes of this sort of cabling is not to increase the interconnect bandwidth beyond that of over-the-air, but to prevent leakage and cross contamination of over-the-air traffic and backhaul by containing the traffic in a coaxial cable 2602. In some embodiments, the coaxial cable 2602 is multiply shielded, or wrapped with additional external shielding outside of the cable (thus allowing commercial cable) to further contain the interior traffic.

In some embodiments, the transceivers may change channels to talk to different adjacent nodes. This may allow smaller regions to be free of cross-region interference. For example, in a linear chain, one can configure the channels to be, say, channel 36 for one region and 151 for another. The further apart the channels, the less adjacent-channel interference becomes an issue. Some embodiments may use notch or high-pass or low-pass filters to physically enforce this. Some embodiments may use flat attenuators or switches to disconnect the cables going left and/or right. In some embodiments, the filters are connected to RF switches, to allow a transceiver to choose whether it wants to communicate on or be attenuated on a particular channel. Such switches can be driven by local GPIOs. For example, if every link between two transceivers on a linear chain was assigned alternating high and low 5 GHz channels, such as A-151-B-36-C-151-D-36 . . . , where ABCD are the transceiver nodes and the numbers are the links. If B wants to talk to A or vice versa, both change to channel 151. If B and C want to talk, both change to channel 36. Depending on the distance between the nodes, as determined by manufacturing and product convenience, there may already be sufficient attenuation to allow A and B and C and D to talk simultaneously. But in embodiments where there is not, then B and/or C can switch out the B to C link, thus ensuring reduced interference. This link switching can be done by disconnecting the link entirely, using the B-to-C path RF switches to internally attenuate. Or it can be done by introducing hi/low/notch filters to force the channel communications. In this way, every other link can take turns, and ensure complete communication without requiring large collision domains. In some embodiments, higher-level scheduling may be employed to further divide up the access, to allow for efficient turn-taking and medium access. The fundamental basics of scheduling is understood in the art. Other options are for the hi/low/notch filters to be used to establish dynamic collision domains greater than two nodes, and to let the channel/filter changes adjust that dynamism.

In some embodiments, the FEM/amplifiers are omitted. Because of the direct cabling and the lack of over-the-air transmission, the underlying radios usually transmit at a power level that is sufficient for neighbor-to-neighbor direct communication. A front end module that amplifies a signal from, say, −40 dBm to 10 dBm can be skipped on a direct cable where the cable has, say, a 15 dB attenuation and the necessary receive signal strength is −65 dBm or less. FEMs require space (to be kept away from other components) and power, and if they are skipped, the assembly can be further miniaturized and its power budget reduced. In many designs today, CPUs with embedded transceivers have their transceivers terminated because the small board design is too small to allow any use of those transceivers, due to the needed added space and power. But those designs can be used here for the interconnect, requiring only that the terminations be removed and the lines fed into the coax, which can be by restuffing the omitted lanes or accessing the signal through vias or pads (depending on the design, this may require a trivial layout adjustment to surface the terminated lines).

In some embodiments, the CPU performs hop-by-hop traffic bridging. In some embodiments, this uses proper wireless meshing protocols between the Wi-Fi transceivers.

As mentioned, in some embodiments, the traffic is scheduled to coordinate channel changing, attenuator reconfiguration, or transmission timing. This can be done by using an ad hoc scheduler, a master scheduler for the entire transmission infrastructure, or regional masters. Such techniques are known to the art and are based on centralized or distributed graph coloring or dominating set calculations.

3.3 Radios

Although the preceding sections of this disclosure describe use of Wi-Fi radios in detail, the scope of the present technology is not limited to Wi-Fi. Other radio types may be used in the alternative, or in combination with Wi-Fi.

Figure 27:
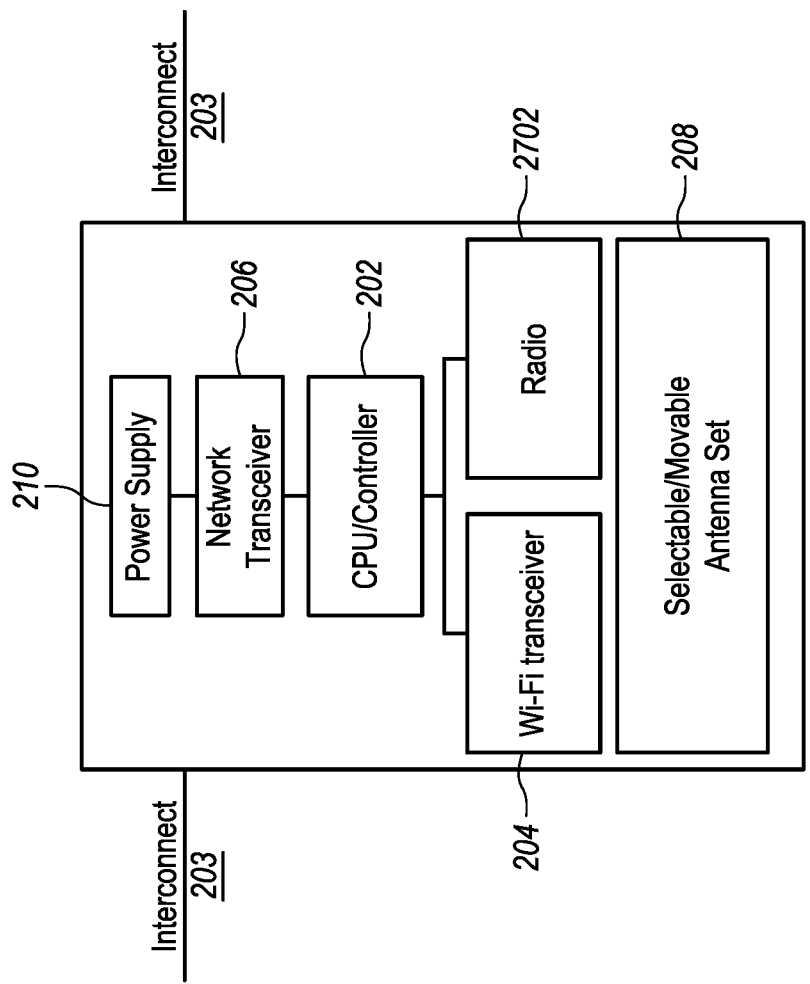
FIGS. 27 and 28 are each a block diagram of an embodiment of an integrated access point and its context.

FIG. 27 is a block diagram of an integrated access point 112 and its context, in an embodiment. FIG. 27 illustrates how embodiments may use a diversity of Radio 2702 types. Some embodiments share on a node (via a common card or series of cards connected as above with flexible interconnects) multiple radio types. Some embodiments connect the radio types into a shared antenna distribution system, such as a selectable antenna set. In some embodiments, the radios are Wi-Fi and Bluetooth, or Zigbee, or Z-Wave, or Thread. In some embodiments, they are 5G or CBRS. In some embodiments, the antenna distribution can take very different bands, and so the radios are such as 2.4 GHz/3.5 GHz/5 GHz/6 GHz and 60 GHz, such as 802.11ad and its children.

One advantage for carrying multiple radios is that the radio technology of choice by the customer may change over the lifetime of the installation, and the deployment infrastructure of the present technology may be ideal for allowing customers to make that choice one radio at a time or system wide. Nothing in the present technology, in general, prevents other radio technologies from existing simultaneously.

Figure 28:
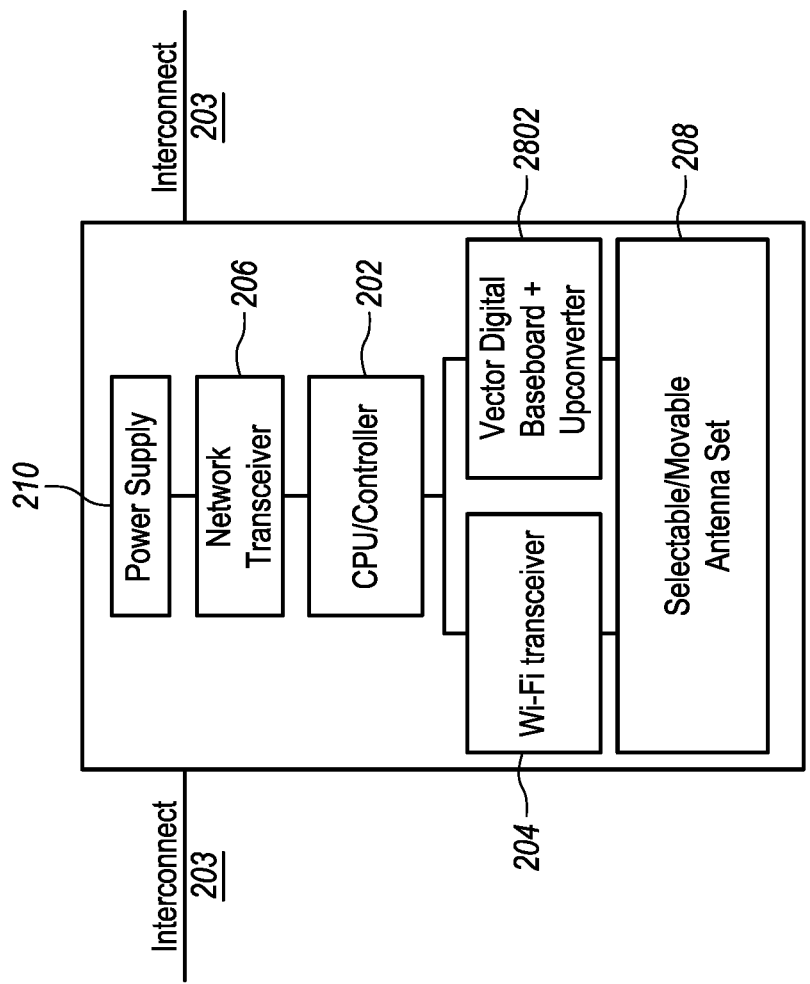

FIG. 28 is a block diagram of an integrated access point 112 and its context, in an embodiment. FIG. 28 illustrates that some embodiments may use a programmable vector or digital baseband 2802. These vector or digital basebands 2802 allow for multiple radio types to be employed. Digital basebands are commercially available and are often either software defined radio DSPs or vector high-speed signal processors that can convert bitstreams into radio signals and back. An advantage of using software-defined radios is that it allows for possible software upgrade of the protocol, or even a switch to a completely different protocol, subject to the performance of the FEMs. In some embodiments, the output from the digital radios is sent into a switched network of band-specific FEMs and filters, to thus allow radios to be reprogrammed into different bands. This is especially useful when the band is not anticipated at deployment time. For example, in Wi-Fi, the 6 GHz band was made available by the FCC after most products were deployed. Only some products can take advantage of that upgrade in the field. Often the radio transceivers were fixed to the 5 GHz band. And even for radios that were not fixed, the FEMs were often limited to 5 GHz. Depending on the antenna 208 design used, it may be possible to perform a field upgrade by software to unlock a new band, subject to the restrictions of the components in the deployment. For example, some antennas 208 radiate at peak at 5 GHz but may also radiate at acceptable impedance and reflections at 6 GHz or 3 GHz, and thus in some embodiments a high-pass 5 GHz filter can be disabled to allow 3 GHz transmission. Switchable filters may add minor cost to a deployment, but can allow greater flexibility.

Figure 29:
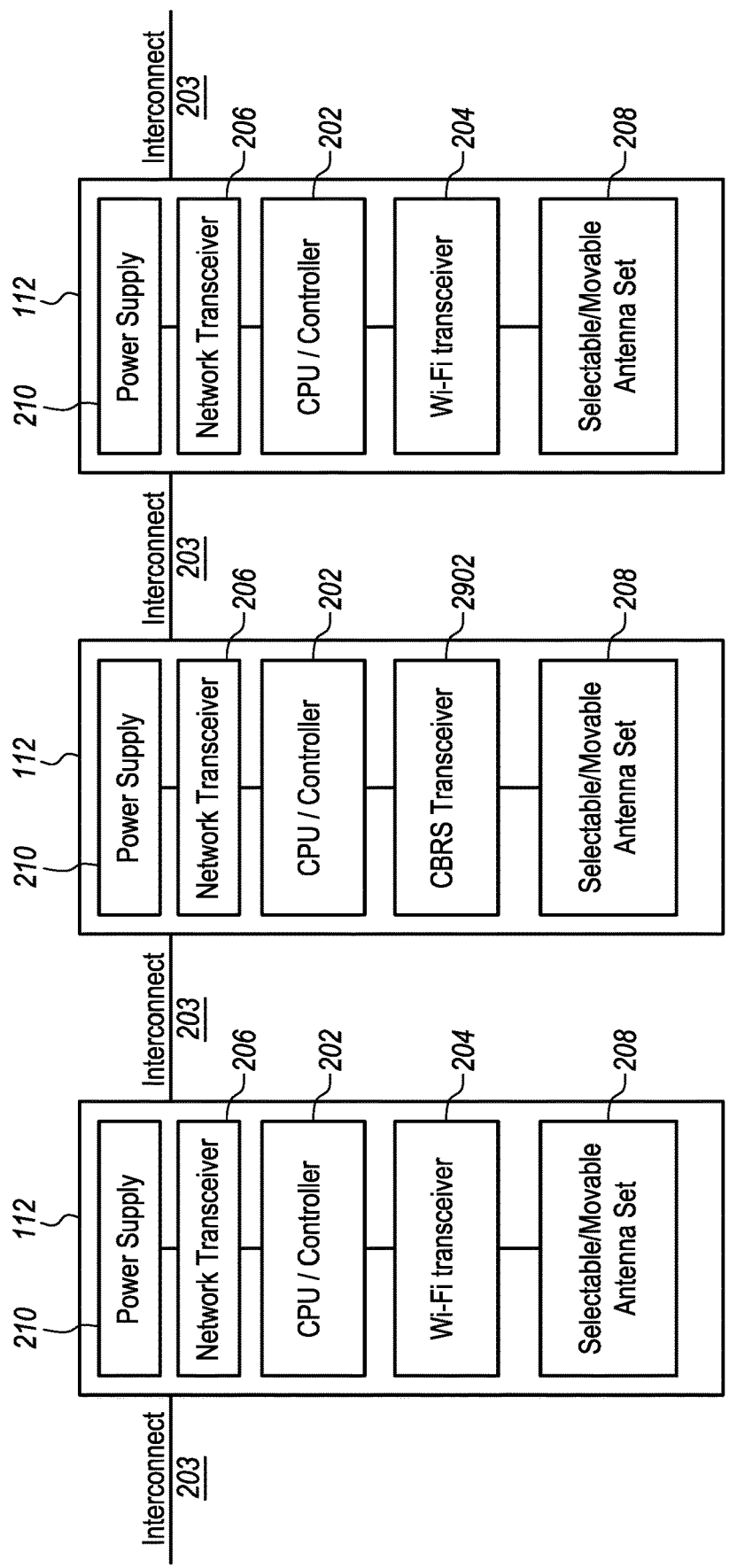
FIG. 29 is a block diagram showing three integrated access points that are interconnected, and their context, in an embodiment.

FIG. 29 is a block diagram showing three integrated access points 112 that are interconnected, and their context, in an embodiment. FIG. 29 illustrates radio card diversity. In the embodiment of FIG. 29, a CBRS transceiver 2902 is used in one integrated access point 112, while the other two depicted integrated access points 112 use Wi-Fi transceivers 204. Radio card diversity is an important deployment and manufacturing option. Since the backplane and radio uses are often independent, in some embodiments, the particular radio card flavor can be chosen at final assembly time. This can be done to produce different SKUs. An advantage of that is that radio cards themselves may have very long lead times, and so building an inventory of them in advance is advantageous, but final assembly can be just in time or close to it, thus allowing quick decisions to create new SKUs or reconfigure existing ones. Thus, a product line which on one day consists of a fixed radio type can be altered to intersperse different radio types. In some embodiments, the two radio type cards are adjacent, and are fed into the same or similar antenna distribution infrastructure with a tee or wye. In some embodiments, these joints are also additionally filtered by band, by inserting band-specific attenuators or filters. In some embodiments, the wyes or tees are on flexible or rigid small floating or daughter boards, thus allowing more passive or active components to be created. The ability to assemble using just-in-time parts on a generic backbone may provide major advantages for product mix design and upgradability.

Throughout this disclosure, multiple inventions are listed that are either separate or derived from other inventions in this disclosure. It is to be understood that the combinations and subprocesses of these inventions are also taught by this disclosure, as the combinations and subprocesses are able to be anticipated by those skilled in the art upon and only upon reading this disclosure. Furthermore, uses of the plural or the singular do not restrict the number of the item being mentioned: unless explicitly called out as not being so or being logically inconsistent, mentions of singular items are to be construed to also be plural and vice versa.

Throughout this disclosure, multiple alternative embodiments are listed. Each embodiment differs in tradeoffs or effects and as such is a best embodiment for that set of tradeoffs and effects. The choice of alternative to use depends on the tradeoffs or effects desired by an implementer skilled in the art, and such choice is obvious and straightforward within the art and requires no further invention or discovery. Conditional language such as "could", "can", and "may" are intended to refer to and are to be construed as referring to options (manufacture, configuration, or based on availability) within embodiments of the invention and do not state that additional invention is required. For example, the statement that "the invention can react to a given input" means that one configuration of one assembly of an embodiment of the present invention does indeed react to that input. This is done for linguistic economy only and does not suggest uncertainty or incompleteness as it relates to the invention being taught or otherwise. This disclosure does not speculate as to the future state of the art; it states a current invention that has been reduced to practice. Examples are provided as explicit embodiments of the invention, as well as to elucidate the teaching.

This disclosure lists sufficient details to enable those skilled in the art to construct a system around or a technology using the novel methods of the contained inventions, without further discovery or invention.

What is claimed is:

1. A system for providing access to a wireless network, comprising:
   a plurality of integrated access points each comprising components including at least a radio, a CPU, an antenna, and an off-CPU Ethernet switch, each integrated access point being embedded into a material expanse that integrates the components of the integrated access points;
   at least the radio, CPU, and Ethernet switch of each respective integrated access point being assembled on one or more corresponding rigid assembly boards; and
   a unified backplane interconnect, the unified backplane interconnect comprising one or more Ethernet interconnect lines, each Ethernet interconnect line comprising a plurality of Ethernet cables communicatively coupled in series through one or more off-CPU Ethernet switches, each Ethernet cable of each Ethernet interconnect line connecting a pair of integrated access points.

2. The system of claim 1, further comprising at least two Ethernet interconnect lines, each of the at least two Ethernet interconnect lines being interwoven and only connecting integrated access points that are not adjacent.

3. The system of claim 1, the material expanse comprising a strip.

4. The system of claim 3, each assembly board being embedded into a respective built-up strip enclosure comprising a potting, and each strip enclosure further comprising at least one of a foil, a foam, or a plastic tape in direct contact with each respective assembly board.

5. The system of claim 1, the unified backplane interconnect further comprising a head-end configured to receive electrical power and communicate with the wireless network, the head-end comprising an External Network to Backplane Converter, the head-end being coupled to a first integrated access point by a first interconnect.

6. The system of claim 1, each assembly board comprising a rigid card and one or more subassembly boards, each rigid card comprising a power supply, a network transceiver, and the respective CPU of one of the integrated access points, and each subassembly board comprising a Wi-Fi transceiver, the respective rigid card and one or more subassembly boards of each integrated access point being coupled in series.

7. The system of claim 6, each Wi-Fi transceiver comprising a radio module that emits complex analog baseband signals and one or more additional modules that upconvert, switch, and amplify the signals.

8. The system of claim 6, each CPU being associated with one or more Wi-Fi transceivers, each CPU configured to use Wi-Fi as a captive backhaul, and each interconnect connecting adjacent integrated access points comprising a coaxial cable.

9. The system of claim 1, the radio of each integrated access point comprising one of a vector baseband radio or digital baseband radio, and each integrated access point comprising at least one other radio.

10. The system of claim 1, at least one assembly board comprising a Wi-Fi transceiver, and at least one other assembly board comprising a transceiver that is not a Wi-Fi transceiver.

11. The system of claim 1, the components of each integrated access point further comprising a power supply and a network transceiver.

12. The system of claim 1, a distance from the radio of a first integrated access point to the radio of at least one other integrated access point being at least ten feet.

\* \* \* \* \*